(12) United States Patent
Hung et al.

(10) Patent No.: US 8,339,506 B2
(45) Date of Patent: Dec. 25, 2012

(54) IMAGE CAPTURE PARAMETER ADJUSTMENT USING FACE BRIGHTNESS INFORMATION

(75) Inventors: Szepo R. Hung, Carlsbad, CA (US); Ruben M. Velarde, Chula Vista, CA (US); Jingqiang Liang, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 12/429,970

(22) Filed: Apr. 24, 2009

(65) Prior Publication Data

US 2010/0271507 A1  Oct. 28, 2010

(51) Int. Cl.
*H04N 5/238* (2006.01)
(52) U.S. Cl. ........................ 348/364; 348/363
(58) Field of Classification Search .......... 348/234–238, 348/362–364; 382/118, 190, 289
See application file for complete search history.

(56) References Cited

U.S. PATENT DOCUMENTS

| | | | |
|---|---|---|---|
| 6,249,317 B1 | 6/2001 | Hashimoto et al. | |
| 7,023,484 B2 * | 4/2006 | Watanabe | 348/364 |
| 7,027,619 B2 | 4/2006 | Pavlidis et al. | |
| 7,084,905 B1 * | 8/2006 | Nayar et al. | 348/222.1 |
| 7,197,166 B2 * | 3/2007 | Jeng | 382/118 |
| 7,376,270 B2 | 5/2008 | Chen et al. | |
| 7,936,919 B2 * | 5/2011 | Kameyama | 382/167 |
| 8,233,789 B2 * | 7/2012 | Brunner | 396/213 |
| 2001/0019620 A1 * | 9/2001 | Nagai et al. | 382/104 |
| 2001/0036298 A1 * | 11/2001 | Yamada et al. | 382/118 |
| 2004/0208114 A1 | 10/2004 | Lao et al. | |
| 2004/0228528 A1 | 11/2004 | Lao | |
| 2005/0129331 A1 | 6/2005 | Kakiuchi et al. | |
| 2006/0008173 A1 | 1/2006 | Matsugu et al. | |
| 2006/0066912 A1 | 3/2006 | Kagaya | |
| 2006/0158704 A1 | 7/2006 | Kameyama | |
| 2006/0181618 A1 * | 8/2006 | Kameyama | 348/234 |
| 2006/0257039 A1 | 11/2006 | Matsuhira | |
| 2007/0041640 A1 | 2/2007 | Tabata et al. | |
| 2007/0071316 A1 | 3/2007 | Kubo | |
| 2007/0085911 A1 | 4/2007 | Nakamura | |
| 2007/0263909 A1 * | 11/2007 | Ojima et al. | 382/118 |
| 2008/0013799 A1 * | 1/2008 | Steinberg et al. | 382/118 |
| 2008/0062277 A1 * | 3/2008 | Hirai et al. | 348/229.1 |
| 2008/0080744 A1 * | 4/2008 | Tanaka | 382/118 |
| 2008/0117305 A1 | 5/2008 | Rogers et al. | |
| 2008/0175481 A1 * | 7/2008 | Petrescu et al. | 382/190 |
| 2008/0226279 A1 * | 9/2008 | Dey et al. | 396/234 |
| 2009/0067682 A1 * | 3/2009 | Ohk et al. | 382/118 |
| 2009/0073287 A1 * | 3/2009 | Shimizu | 348/234 |

FOREIGN PATENT DOCUMENTS

EP   1441497   7/2004

OTHER PUBLICATIONS

International Search Report and Written Opinion—PCT/US2010/032043, International Search Authority—European Patent Office—Jul. 5, 2010.

* cited by examiner

*Primary Examiner* — Tuan Ho
(74) *Attorney, Agent, or Firm* — James R. Gambale, Jr.

(57) ABSTRACT

A system and method of image capture parameter adjustment using face brightness information is disclosed. In a particular embodiment, a method is disclosed that includes determining a luma value based on a brightness variation within a selected portion of an image, where the selected portion of the image corresponds to at least a portion of a face. The method further includes adjusting an image capture parameter at least partially based on the determined luma value.

26 Claims, 20 Drawing Sheets

IMAGE CAPTURE PARAMETER ADJUSTMENT USING FACE BRIGHTNESS INFORMATION

FIELD

The present disclosure is generally related to image capture parameter adjustment using face brightness information.

DESCRIPTION OF RELATED ART

A camera or other image capturing device, such as for example, a cell phone, may provide a level of brightness in an image that can be adjusted. The level of brightness in the image can be adjusted by, for example, adjusting an aperture size or a shutter speed. Because faces are often considered important in photographs, a brightness level can be adjusted to achieve an appropriate brightness of a face in an image. However, difficulties arise because faces may have light skin color or dark skin color. An appropriate brightness level for a light-skinned face may be an inappropriate brightness level for a dark-skinned face.

SUMMARY

Embodiments herein provide methods and devices for adjusting an image capture parameter, such as a shutter speed or aperture size, to achieve an appropriate brightness of a face region in an image. Embodiments account for an appropriate brightness level that depends upon whether skin color is dark or light. Skin color can be estimated based on a brightness variation within a face. A face brightness variation that depends upon skin color may be determined and the brightness of the image may be adjusted to achieve a target luma value based on the brightness variation.

In a particular embodiment, a method is disclosed that includes determining a luma value based on a brightness variation within a selected portion of an image, where the selected portion of the image corresponds to at least a portion of a face. The method further includes adjusting an image capture parameter, such as a shutter speed or aperture size, at least partially based on the determined luma value.

In another particular embodiment, a method is disclosed that includes performing a first exposure operation to capture a first preview image with a first exposure. The method further includes performing a face detection operation on the first preview image to detect at least a portion of a face. The method includes determining brightness information at least partially based on a brightness of pixels within the detected portion of the face. The method also includes determining a luma value at least partially based on the brightness information. The method also includes performing a second exposure operation to capture a second preview image with a second exposure, such that the second preview image has a second luma value that substantially matches the determined luma value.

In another particular embodiment, an apparatus is disclosed that includes a luma determination module to determine a luma value based on brightness information of a face region of an image. The apparatus further includes an image capture parameter adjustment module to determine an image capture parameter based at least in part on the determined luma value.

In another particular embodiment, an apparatus is disclosed that includes means for determining a luma value based on a brightness variation within a selected portion of an image, where the selected portion of the image corresponds to at least a portion of a face. The apparatus further includes means for adjusting an image capture parameter at least partially based on the determined luma value.

In another particular embodiment, a computer readable tangible medium is disclosed that includes computer code that causes a computer to determine a luma value based on a brightness variation within a selected portion of an image, where the selected portion of the image corresponds to at least a portion of a face. The computer code also causes the computer to determine an image capture parameter based at least in part on the determined luma value.

One particular advantage provided by disclosed embodiments is a luma value that is adjusted to achieve an appropriate level of brightness that depends on whether a face skin color is light or dark. Other aspects, advantages, and features of the present disclosure will become apparent after review of the entire application, including the following sections: Brief Description of the Drawings, Detailed Description, and the Claims.

DETAILED DESCRIPTION

Figure 1:
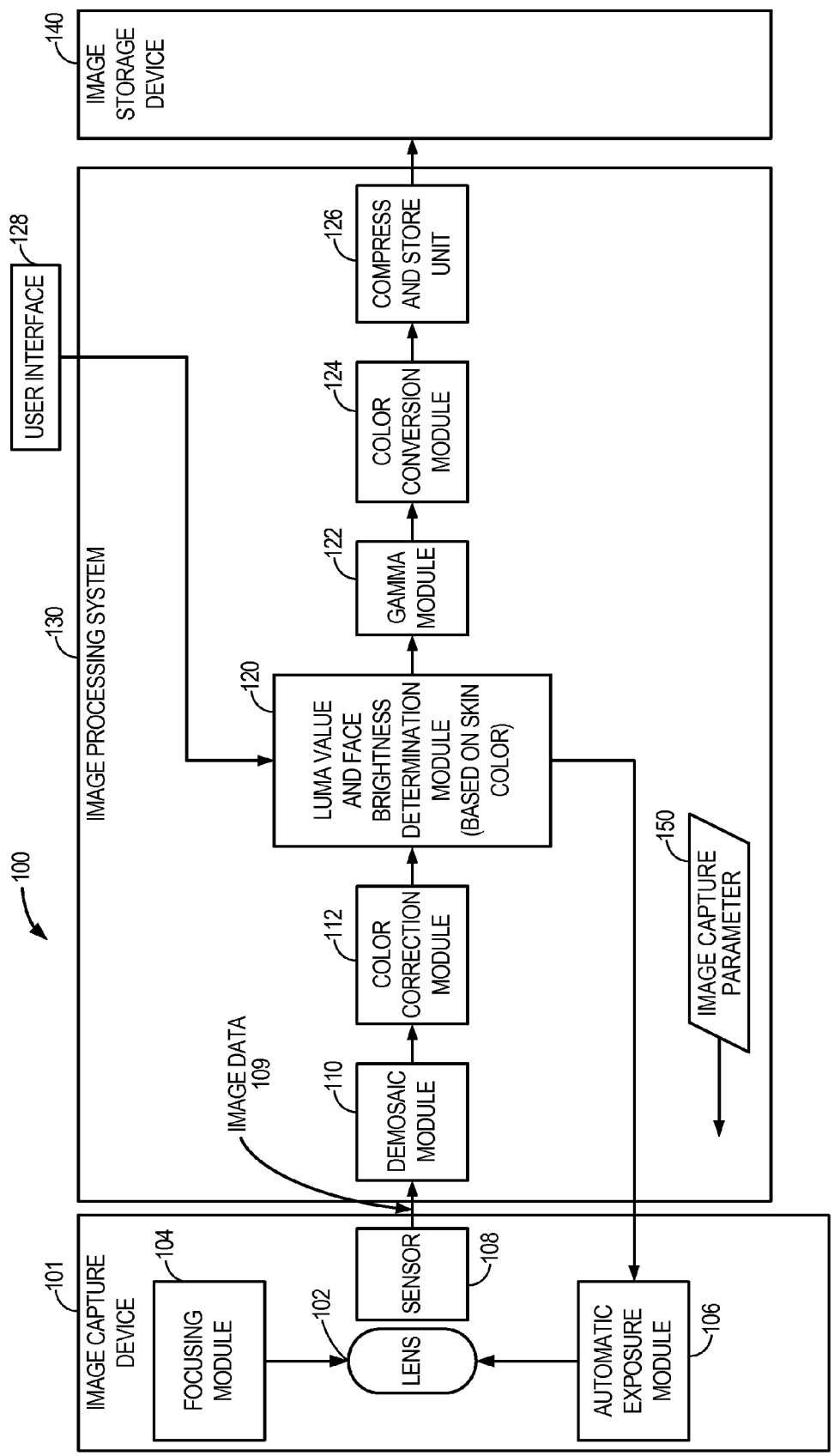
FIG. 1 is a block diagram of an embodiment of an image capturing and processing system having a luma value and face brightness determination module.

FIG. 1 is a block diagram of an embodiment of an image capturing and processing system 100 having a luma value and face brightness determination module 120. The system 100 includes an image capture device 101 coupled to an image processing system 130. The image processing system 130 is coupled to an image storage device 140. The image processing system 130 is configured to receive image data 109 from the image capture device 101 and to process the received image data 109 by performing operations on the image data 109 that include determining a face brightness variation. Generally, the system 100 may be implemented in an electronic device that is configured to perform real-time image processing using relatively limited processing resources.

In a particular embodiment, the image capture device 101 is a camera, such as a video camera or a still camera. In other embodiments, the image capture device 101 may be a camera embodied in a cellular telephone, a personal digital assistant (PDA) or other portable electronic device. The image capture device 101 includes a lens 102 that is responsive to a focusing module 104 and to an automatic exposure control module 106. A sensor 108 receives light via the lens 102 and generates the image data 109 in response to an image received via the lens 102. The focusing module 104 may be responsive to the sensor 108 and may be adapted to automatically control focusing of the lens 102. The automatic exposure control module 106 may also be responsive to the sensor 108 and may be adapted to automatically control an exposure of the image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 provides the image data 109 to the image processing system 130. The image processing system 130 includes a demosaic module 110 to perform a demosaic operation on the image data 109 received from the image capture device 101. A color correction module 112 is configured to perform color correction on demosaiced image data. In one embodiment, the exposure of the image may be adjusted to avoid saturation of a color channel in a face in the image.

The luma value and face brightness determination module 120 determines a luma value from a face brightness variation and may automatically adjust an image capture parameter to achieve the determined luma value. A luma value is a measure of the brightness of the image. The luma value may be determined by, for example, computing the average brightness of pixels in a captured image. The face brightness determination module 120 may, in some embodiments, compute a ratio of an average brightness of a first group of pixels in a face region to the average brightness of the brightest pixels of a second group of pixels in the face region. This ratio may compare a brightness of non-skin areas of the face such as the eyes or mouth, to skin areas and to enable estimation of skin color, as will be discussed. The ratio may be compared to a threshold to classify the face as dark or light. Also, in some embodiments a luma value is determined from the ratio by using a look up table. The luma value determines an adjustment to an image capture parameter 150, such as an aperture size or a shutter speed, to alter the exposure to achieve the luma value. By achieving a luma value based on the face brightness variation, an appropriate face brightness can be achieved that accounts for the color of the face.

A gamma module 122 is configured to generate gamma corrected image data from data received from the color correction module 112. In some embodiments, the gamma module 122 may be situated before the luma value and face brightness determination module 120 to perform gamma correction before the brightness information is determined. In some embodiments, gamma correction is performed after the brightness information is determined. A color conversion module 124 is coupled to perform a color space conversion to the gamma corrected image data. A compress and store module 126 is coupled to receive an output of the color conversion module 124 and to store compressed output data at the image storage device 140. The image storage device 140 may include any type of storage medium, such as one or more display buffers, registers, caches, flash memory elements, hard disks, any other storage device, or any combination thereof. A user interface 128 enables the user to adjust brightness and other image processing parameters, such as shutter speed and aperture size.

By determining a face brightness variation, a luma value may be determined to achieve a face brightness that is appropriate to the skin color of the face. This prevents light-skinned faces from appearing too dark and dark-skinned faces from appearing too bright.

Figure 2:
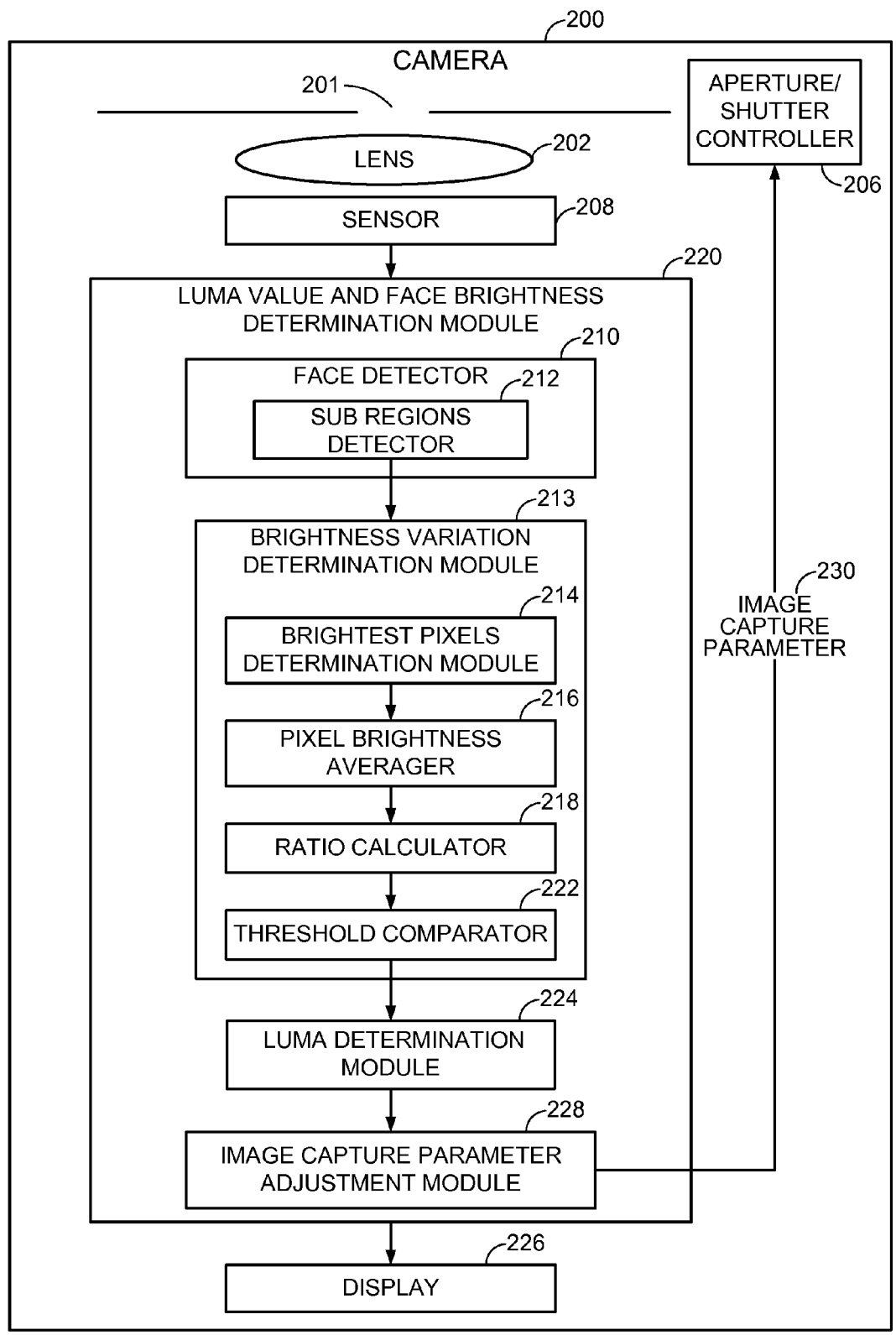
FIG. 2 is a block diagram of an embodiment of a camera that detects a face brightness and adjusts an aperture setting in response to the detected face brightness.

FIG. 2 is a block diagram of an embodiment of a camera 200 that is configured to detect face brightness and to adjust an image capture parameter in response to the detected face brightness. The camera 200 includes an aperture 201, a lens 202, and a sensor 208 for capturing an image. The camera 200 also includes a luma value and face brightness determination module 220 and a display 226. The luma value and face brightness determination module 220 includes a face detector 210, a brightness variation determination module 213, a luma determination module 224, and an image capture parameter adjustment module 228. In an illustrative embodiment, the luma value and face brightness determination module 220 is the luma value and face brightness determination module 120 of FIG. 1.

The face detector 210 includes a sub regions detector 212 configured to determine one or more sub regions of a detected face, as will be described with reference to FIG. 3. The sub region is used by the brightness variation determination module 213 to determine a brightness variation, such as will be described with reference to FIGS. 7 and 8. The luma determination module 224 is configured to determine a luma value based at least in part on the brightness variation determined by the brightness variation determination module 213. For example, the luma value may be determined from a look up table by the luma determination module 224, with the address of the luma value selected from the look up table being determined by the brightness variation. The image capture parameter adjustment module 228 is configured to determine an image capture parameter 230 that is sent to an aperture/shutter controller 206 that includes an aperture adjustment device and a shutter speed adjustment mechanism. The aperture/shutter controller 206 may adjust the size of the aperture 201 or may adjust a shutter speed to achieve the determined luma value.

The brightness variation determination module 213 is configured to determine a brightness variation based on the face sub regions detected by the face detector 210. In one embodiment, the brightness variation determination module 213 includes a brightest pixels determination module 214 that is configured to determine a set of brightest pixels in a face region of a captured image. A pixel brightness averager 216 is configured to determine an average brightness of pixels in a face sub region and is also configured to determine an average brightness of the brightest pixels determined by the brightest pixels determination module 214. A ratio calculator 218 is configured to determine a ratio of the average brightness of pixels in a sub region of the face to an average brightness of the brightest pixels in a sub region of the face, as will be described with reference to FIG. 4. In some embodiments, the ratio is compared by a threshold comparator 222 to a threshold to classify the face as either dark or light. The ratio may also be used by the luma determination module 224 to determine a luma value for the captured image based on the brightness variation. The image capture parameter adjustment module 228 is configured to determine an image capture parameter based, at least in part, on the luma value.

As will be explained in more detail below, during operation, the camera 200 captures an image. A face in the image is detected and a brightness variation of the face is determined. A luma value is determined based on the brightness variation. An image capture parameter, such as shutter speed or aperture size, is adjusted to achieve the luma value, which in turn, results in an appropriate level of brightness of the face region of the captured image.

Figure 3:
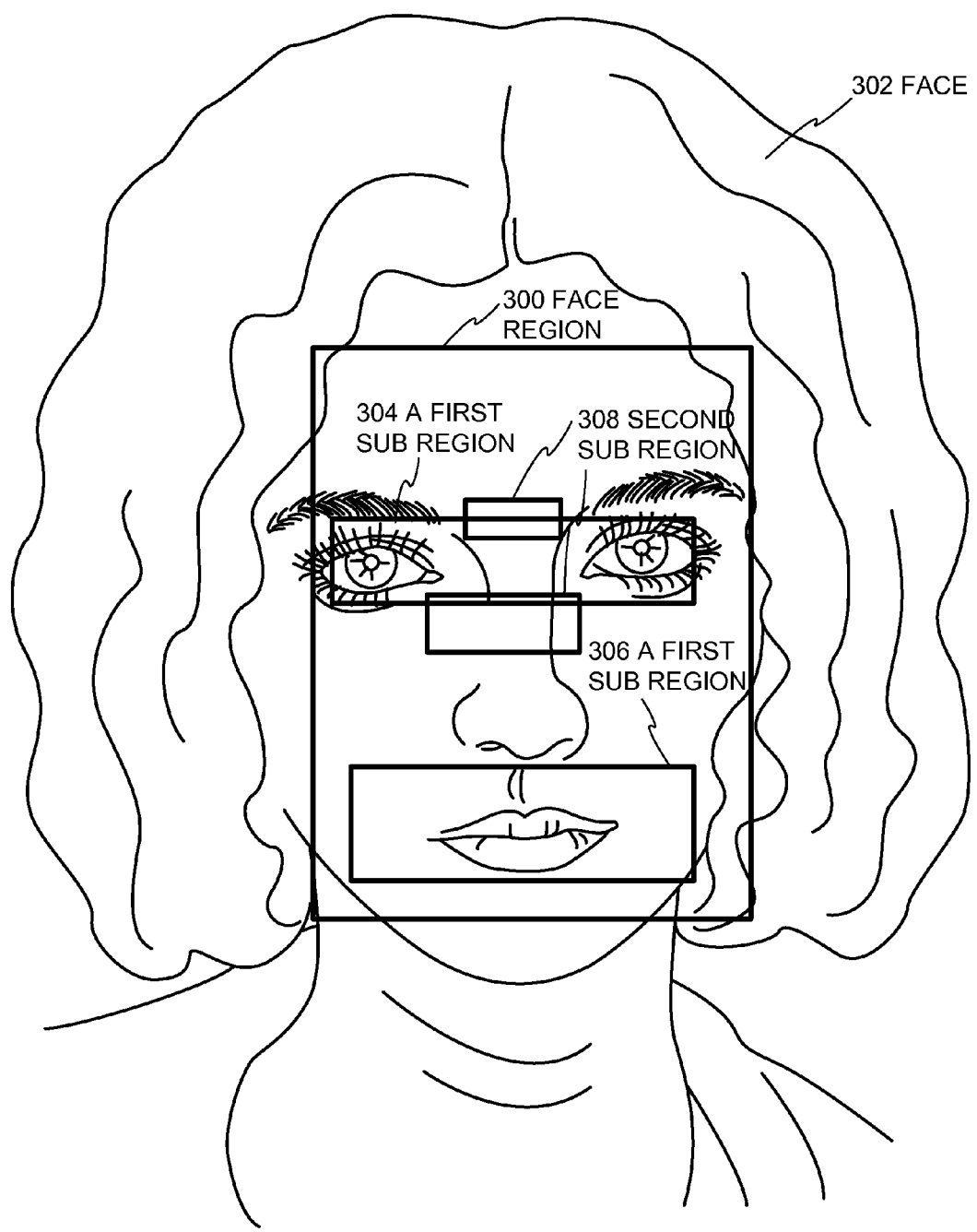
FIG. 3 is a picture of a face that is segmented into regions for face brightness determination.

FIG. 3 is a picture of a face 302 that is segmented into regions for face brightness determination, according to an illustrative embodiment. The face detector 210 is configured to detect a face region 300. The face region 300 may include the face but exclude other features such as hair. The sub regions detector 212 detects a first sub region within the detected face region such as an eye sub region 304 or a mouth sub region 306, to identify the brightness of a non-skin area of the face.

In one embodiment, a ratio of the average pixel brightness in a first sub region that includes the eyes or mouth to the average brightness of the top 10% of the brightest pixels in the first sub region is calculated to determine the brightness variation. In one embodiment, if the ratio is less than 0.51, the face is classified as having dark skin. Otherwise the face is classified as having light skin. In some embodiments, the sub regions detector 212 determines a second sub region 308 of pixels in a skin area, which may be non-contiguous as shown, and may be a subset of a first sub region, such as the eye sub region 304, or may be located wholly or partly outside the first sub region. A ratio of the brightness of the non-skin features of the first sub region to the brightness of the skin in the second sub region is determined to indicate a brightness variation of the face. For example, the brightness of the eyes can be compared to a brightness of brightest pixels in skin areas of the face. In one embodiment, a ratio of the average pixel brightness in a first sub region that includes the eyes or mouth to the average brightness of the top 10% of the brightest pixels in the first sub region is calculated to determine the brightness variation. In one embodiment, if the ratio is less than 0.51, the face is classified as having dark skin. Otherwise the face is classified as having light skin.

Figure 4:
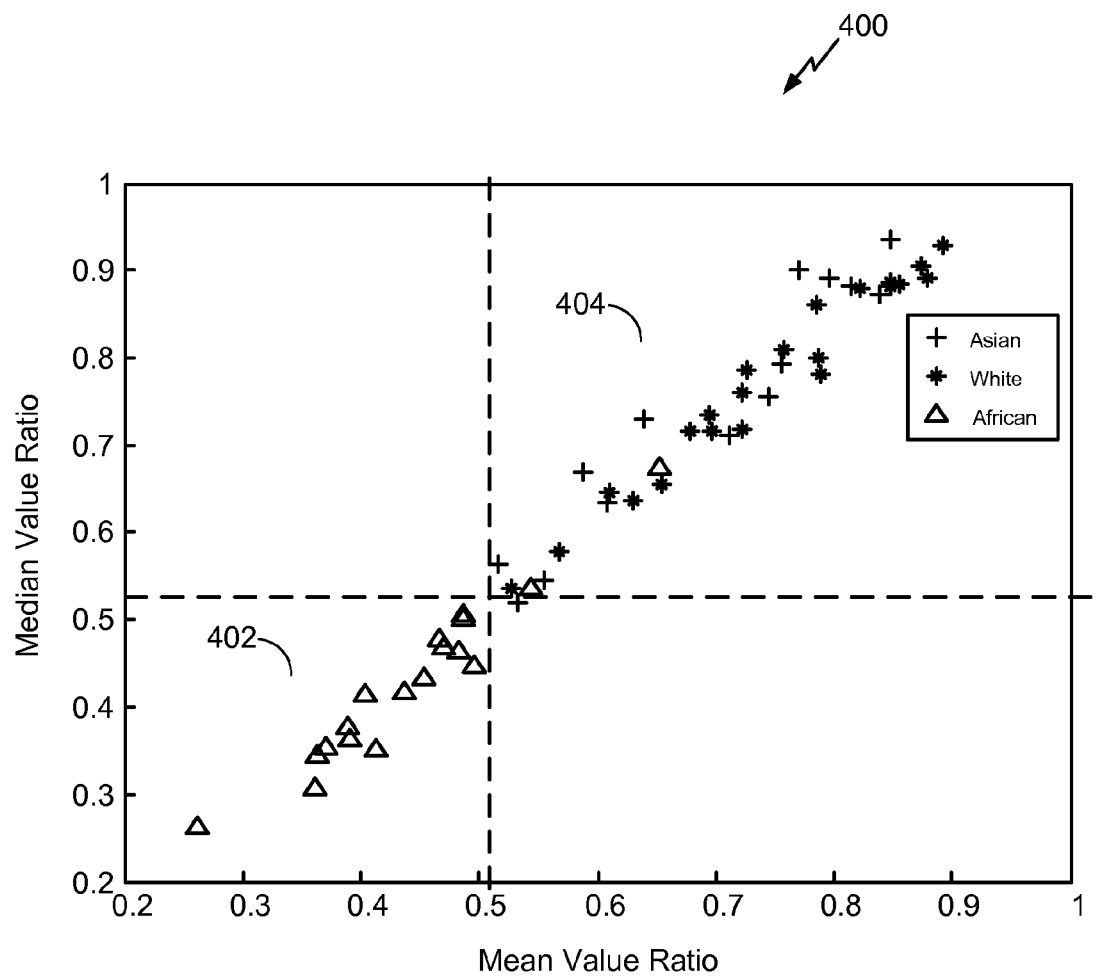
FIG. 4 is a graph showing a distribution of brightness values corresponding to different races of people.

FIG. 4 is a graph showing a particular embodiment of a distribution 400 of brightness values corresponding to different races of people. The horizontal axis represents mean value ratios. A mean value ratio is the ratio of a mean value of pixel brightness of pixels in a first sub region, such as the sub region 304 of FIG. 3, to a mean value of pixel brightness of brightest pixels in a second sub region, such as sub region 308 of FIG. 3. The vertical axis represents median value ratios. A median value ratio is the ratio of the median value of pixel brightness of pixels in the first sub region to a median value of pixel brightness of brightest pixels in the second sub region.

Data points for Caucasians and Asians are generally located in an upper right area 404 of the graph, whereas values for dark-skinned Africans are generally located in a lower left area 402 of the graph. The graph indicates that different brightness ratios are associated with people of dark or light skin color. In particular, a smaller ratio indicating a larger brightness variation is associated with a dark-skinned face, and a larger ratio indicating a smaller brightness variation is associated with a light-skinned face. A higher luma value for an image is suitable for a light skinned face and a lower luma value is suitable for a dark-skinned face.

Figure 5:
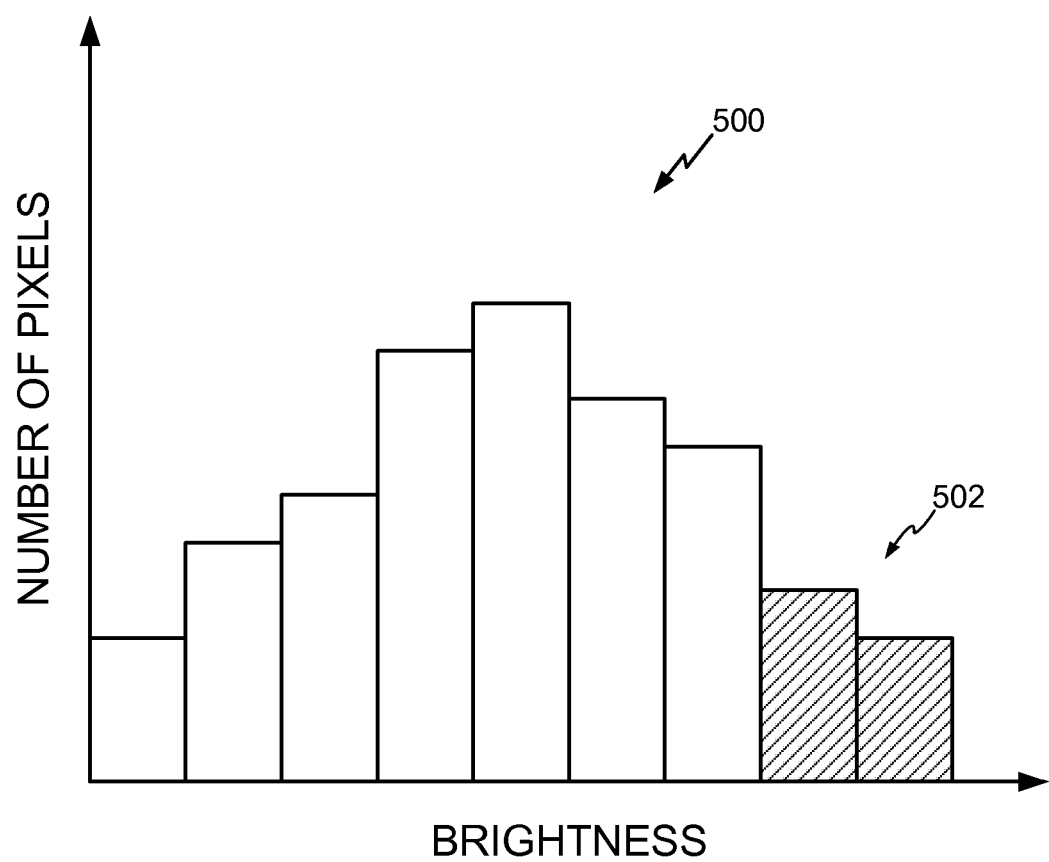
FIG. 5 is an illustrative example of a pixel brightness histogram.

FIG. 5 is an illustrative example of a pixel brightness histogram 500. The horizontal axis represents pixel brightness and the vertical axis represents the number of pixels having a given brightness. By evaluating the histogram 500, the brightness variation determination module 213 of FIG. 2 may be able to isolate a group of brightest pixels 502. For example, the brightness variation determination module 213 may determine the top 10% of brightest pixels by selecting an appropriate brightness value from the histogram and selecting those pixels exceeding the selected brightness value. The shape of the distribution affects the accuracy of the result, so that if the eye sub region 304 of FIG. 3 is unsuitable, due, for example, to the presence of sun glasses, the mouth sub region 306 may be suitable. The testing of a sub region for suitability for use in determining a brightness variation is described with reference to FIG. 11.

Figure 6:
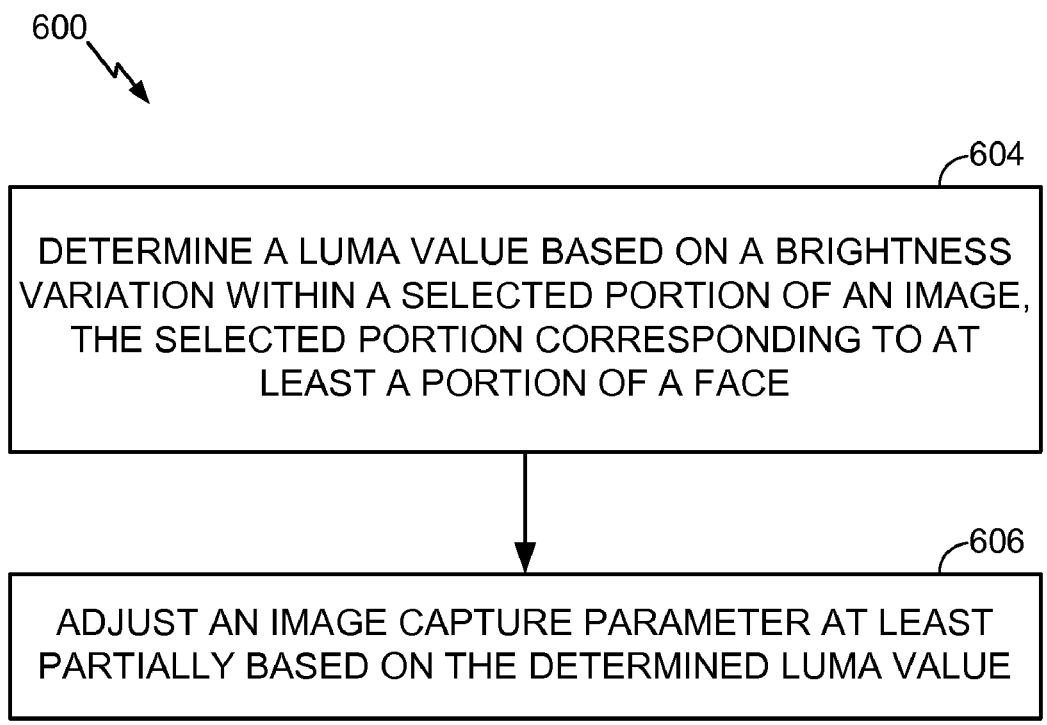
FIG. 6 is a flow chart of an embodiment of a method of determining a luma value and adjusting an image capture parameter based at least partially on the determined luma value.

FIG. 6 is a flow chart 600 of an embodiment of a method of determining a luma value and adjusting an image capture parameter based at least partially on the determined luma value. The method includes determining a luma value based on a brightness variation within a selected portion of an image, at 604. The selected portion of the image corresponds to at least a portion of a face. The brightness variation can be determined by the luma value and face brightness variation determination module 120 of FIG. 1 or the brightness variation determination module 213 of FIG. 2. The luma value can be determined by the luma determination module 224 of FIG. 2. The method also includes adjusting an image capture parameter at least partially based on the determined luma value, at 606. Adjusting the image capture parameter may be performed by the image capture parameter adjustment module 228 of FIG. 2. For example, the image capture adjustment module 228 may adjust an aperture size or shutter speed.

Figure 7:
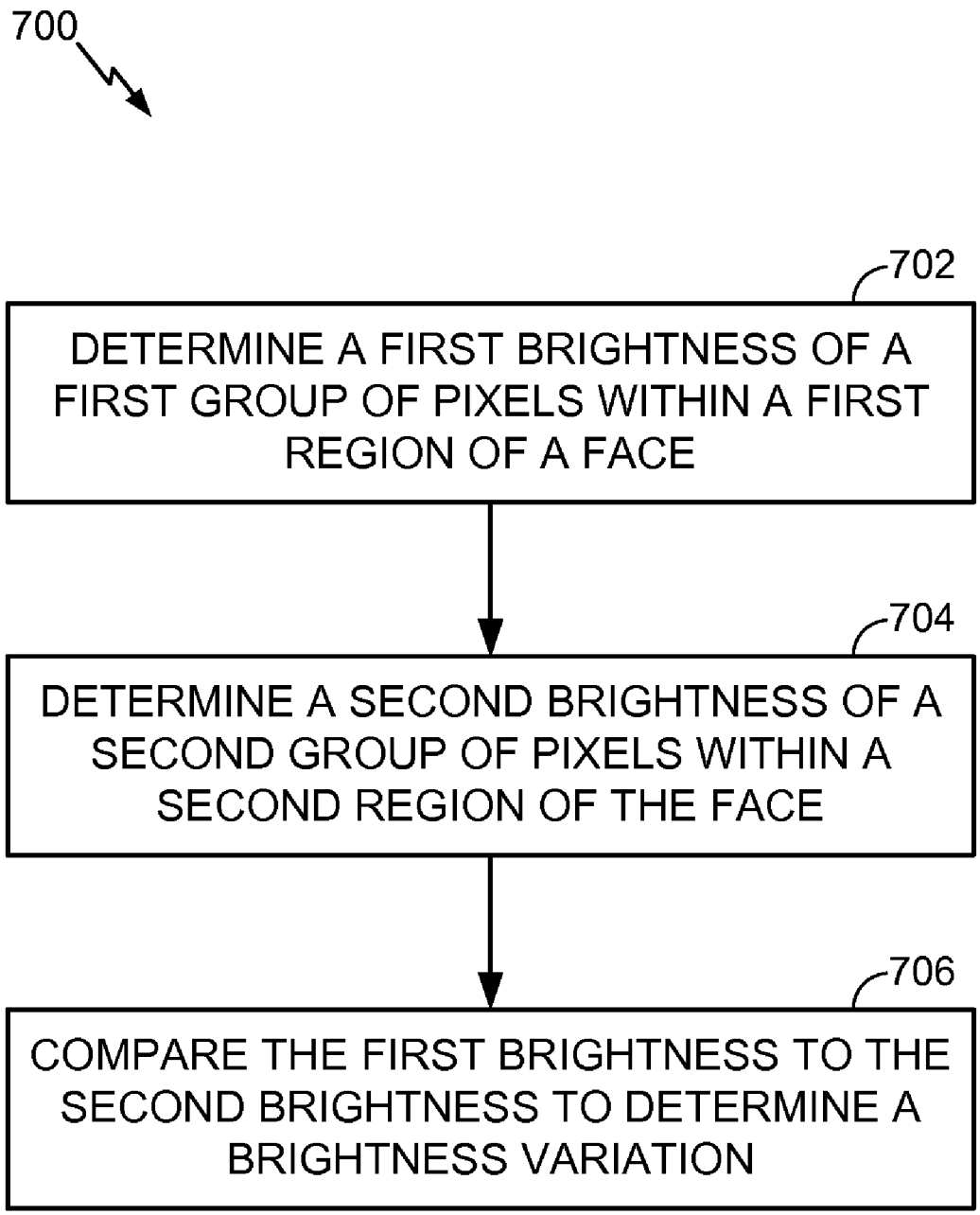
FIG. 7 is a flow chart of an embodiment of a method of determining a brightness variation.

FIG. 7 is a flow chart 700 of an embodiment of a method of determining a brightness variation upon which a luma value may be based. The method includes, determining a first brightness of a first group of pixels within a first region of a face, such as region 304 of FIG. 3, at 702. A second brightness of a second group of pixels of a second region of the face, such as region 308 of FIG. 3, is determined at 704. The first brightness is compared to the second brightness to determine a brightness variation, at 706. In particular, the brightness variation may be determined as the ratio of the first brightness to the second brightness. In another embodiment, the brightness variation may be determined as the difference between the first brightness and the second brightness.

Figure 8:
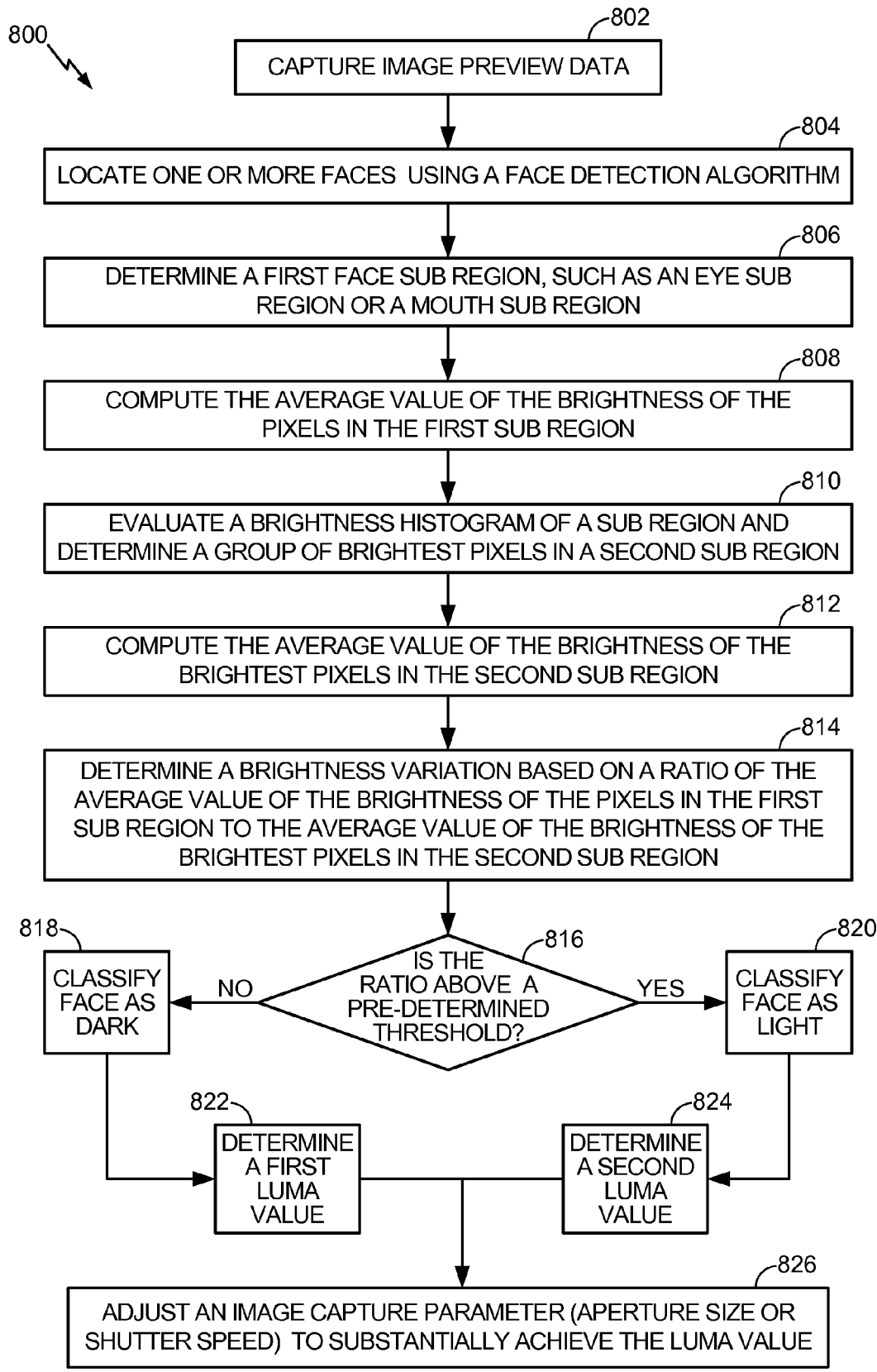
FIG. 8 is a flow chart of an embodiment of a method of determining a brightness variation and a luma value.

FIG. 8 is a flow chart 800 of an embodiment of a method of determining a brightness variation and a luma value. Image preview data is captured, at 802. Image preview data may be data captured by the sensor 208 of FIG. 2 and displayed on display 226 of FIG. 2, prior to storage such as at image storage device 140 of FIG. 1. A face detector, such as the face detector 210 of FIG. 2, locates one or more faces in the image preview data using a face detection algorithm, at 804. A first sub region of a detected face is identified, for example, by the sub regions detector 212 of FIG. 2, at 806. An example of a first sub region is the eyes sub region 304 or the mouth sub region 306 of FIG. 3. The average value of the brightness of the pixels in the first sub region may be determined, for example, by the pixel brightness averager 216 of FIG. 2, at 808.

A brightness histogram, such as shown in FIG. 5, is evaluated to determine a group of brightest pixels in a second sub region of the face, such as sub region 308 of FIG. 3, at 810. The brightest pixels determination may be performed by the brightest pixels determination module 214 of FIG. 2. The average value of the brightness of the brightest pixels in the second sub region is computed, at 812. In a particular embodiment, the first and second sub regions may be coextensive, e.g., the sub region 304 of FIG. 3, such that the average brightness of all pixels and the average of the brightest pixels are determined from the same sub region. A brightness variation is determined based on a ratio of the average value of the brightness of pixels in the first sub region to the average value of the brightness of the brightest pixels in the second sub region, at 814. The ratio may be computed by the ratio calculator 218 of FIG. 2.

Proceeding to 816, the ratio is compared to a threshold, such as by the threshold comparator 222 of FIG. 2. If the ratio is below the threshold, the face is classified as having dark skin, at 818, and a first luma value is determined, at 822. If the ratio is above the threshold, the face is classified as having light skin, at 820, and a second luma value is determined, at 824. The first or second luma value may be determined from a look up table by the luma determination module 224 of FIG. 2. The address of the luma value selected from the look up table is determined by the brightness variation. An image capture parameter, such as aperture size or shutter speed, is adjusted to achieve the determined luma value such as by the image capture parameter adjustment module 228 of FIG. 2, at 826. The method may continue with the user capturing image preview data with the adjusted image capture parameter determined to substantially achieve the determined luma value, as described with reference to FIG. 9.

Figure 9:
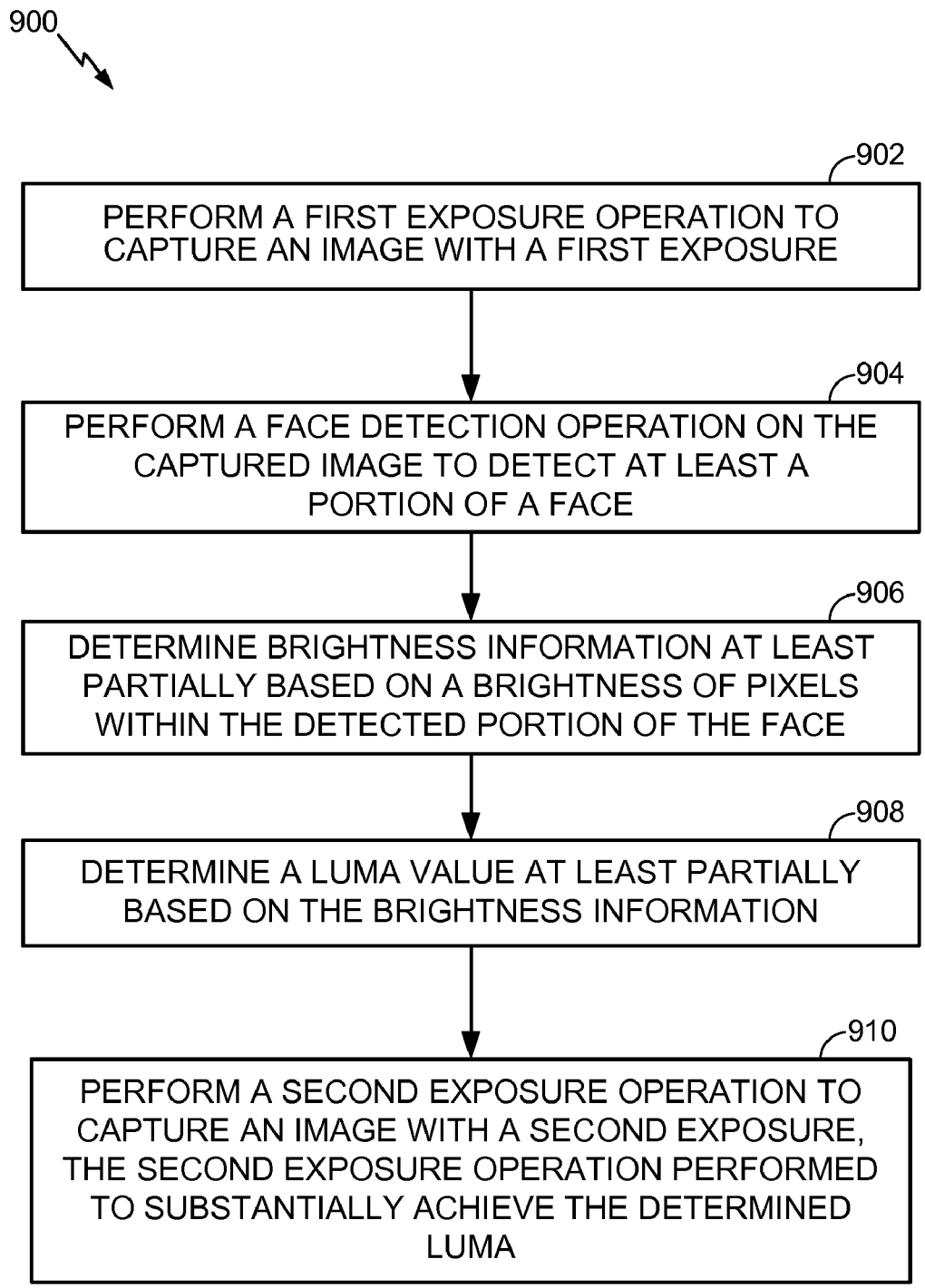
FIG. 9 is a flow chart of an embodiment of a method of performing a first exposure operation, determining a luma value, and performing a second exposure operation to achieve the determined luma value.

FIG. 9 is a flow chart 900 of an embodiment of a method of performing a first exposure operation, determining a luma value, and performing a second exposure operation to achieve the determined luma value. A first exposure operation is performed to capture a first preview image with a first exposure determined by an initial aperture setting and an initial shutter speed, at 902. A face detection operation is performed on the captured first preview image to detect at least a portion of a face, at 904. Brightness information is determined at least partially based on a brightness of pixels within the detected portion of the face, at 906. Determining the brightness information may include comparing a first brightness value corresponding to a first group of pixels to a second brightness value corresponding to a second group of pixels. A luma value is determined based at least partially on the brightness information, at 908. In one embodiment, the luma value is retrieved from a memory location of a table based on the brightness information. In another embodiment, the luma value is determined by multiplying a brightness ratio determined from the brightness information by a skin brightness factor. The skin brightness factor may be determined by dividing a predetermined luma value by a skin brightness value. A second exposure operation is performed to capture a second preview image having a second exposure, at 910. The second exposure operation is performed with an aperture size and shutter speed determined to achieve, or nearly achieve, the determined luma value.

Figure 10:
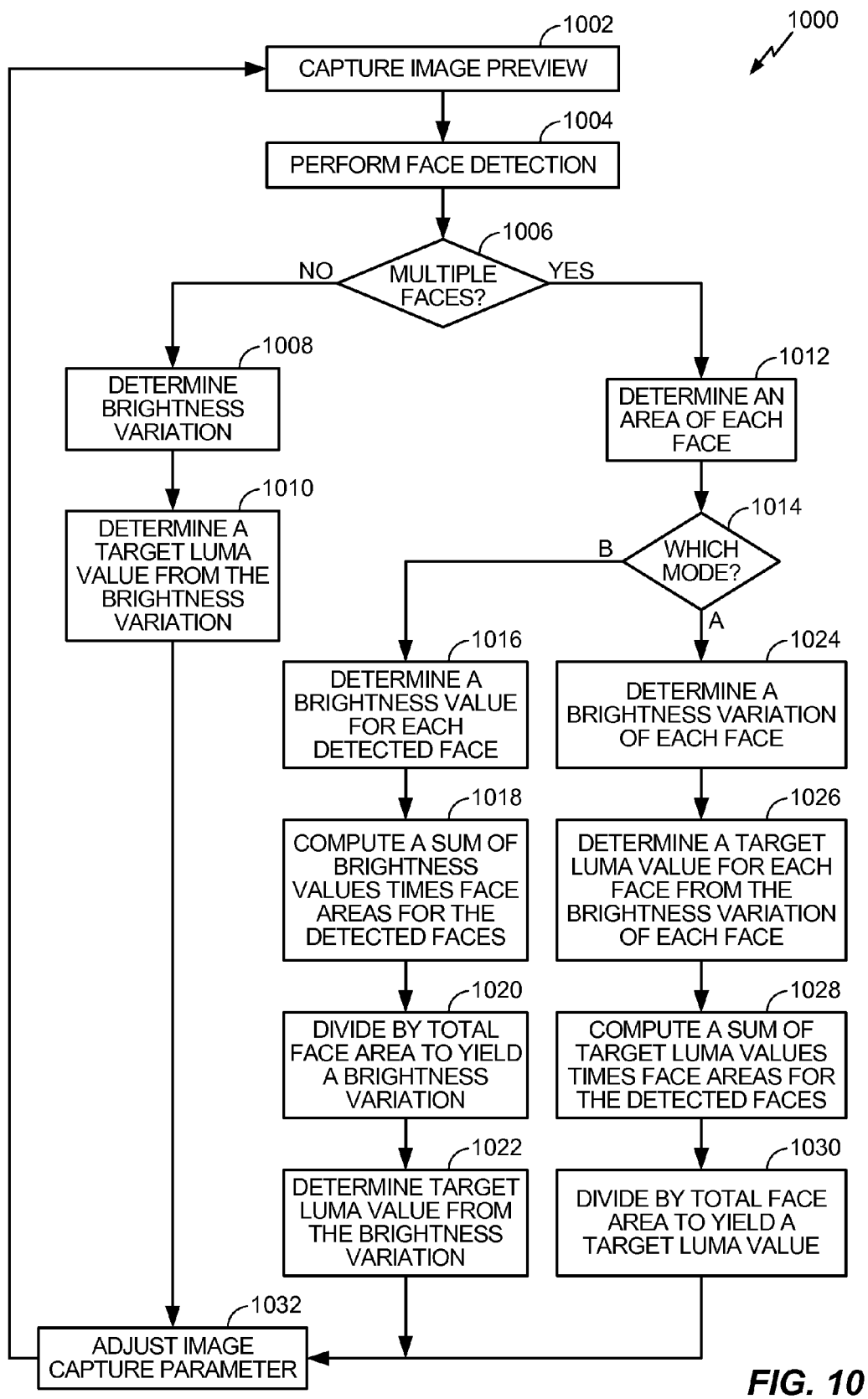
FIG. 10 is a flow chart of an embodiment of a method of adjusting an image capture processing parameter when multiple faces are detected.

FIG. 10 is a flow chart 1000 of an embodiment of a method of adjusting an image capture processing parameter when multiple faces are detected. An image preview is captured, at 1002. Face detection is performed to find one or more faces in the image preview, at 1004. It is determined whether there are multiple faces in the image, at 1006. If there are not multiple faces, then a brightness variation is determined, at 1008. Continuing at 1010, a target luma value is determined from the brightness variation. An image capture parameter is adjusted at 1032 based on the target luma value determined at 1010.

Returning to 1006, if there are multiple faces in the image, then an area of each face is determined at 1012. At 1014, the image capture device may operate in one of two modes. In a first mode A, a brightness variation for each face is determined, at 1024. Proceeding at 1026, a target luma value for each face is determined based on the brightness variation determined for each face. A sum of products of a luma value and a face area for each face is determined, at 1028. The sum is normalized by dividing by the total area of the faces to yield a target luma value, at 1030. Thus, when there are multiple faces, in mode A, the luma value is determined from a normalized, weighted sum of luma values.

Returning to 1014, in a second mode B, a brightness value is determined for each face at 1016. A sum of products of a brightness value and a face area for each face is computed, at 1018. The sum is normalized by dividing by the total face area to yield a brightness variation, at 1020. A target luma value is determined from the brightness variation, at 1022. Thus, when there are multiple faces, in mode B, the luma value is determined from a normalized, weighted sum of face brightness values. An image capture parameter is adjusted at 1032 based on the luma value determined at 1022 or 1030, depending on the mode of operation.

Figure 11:
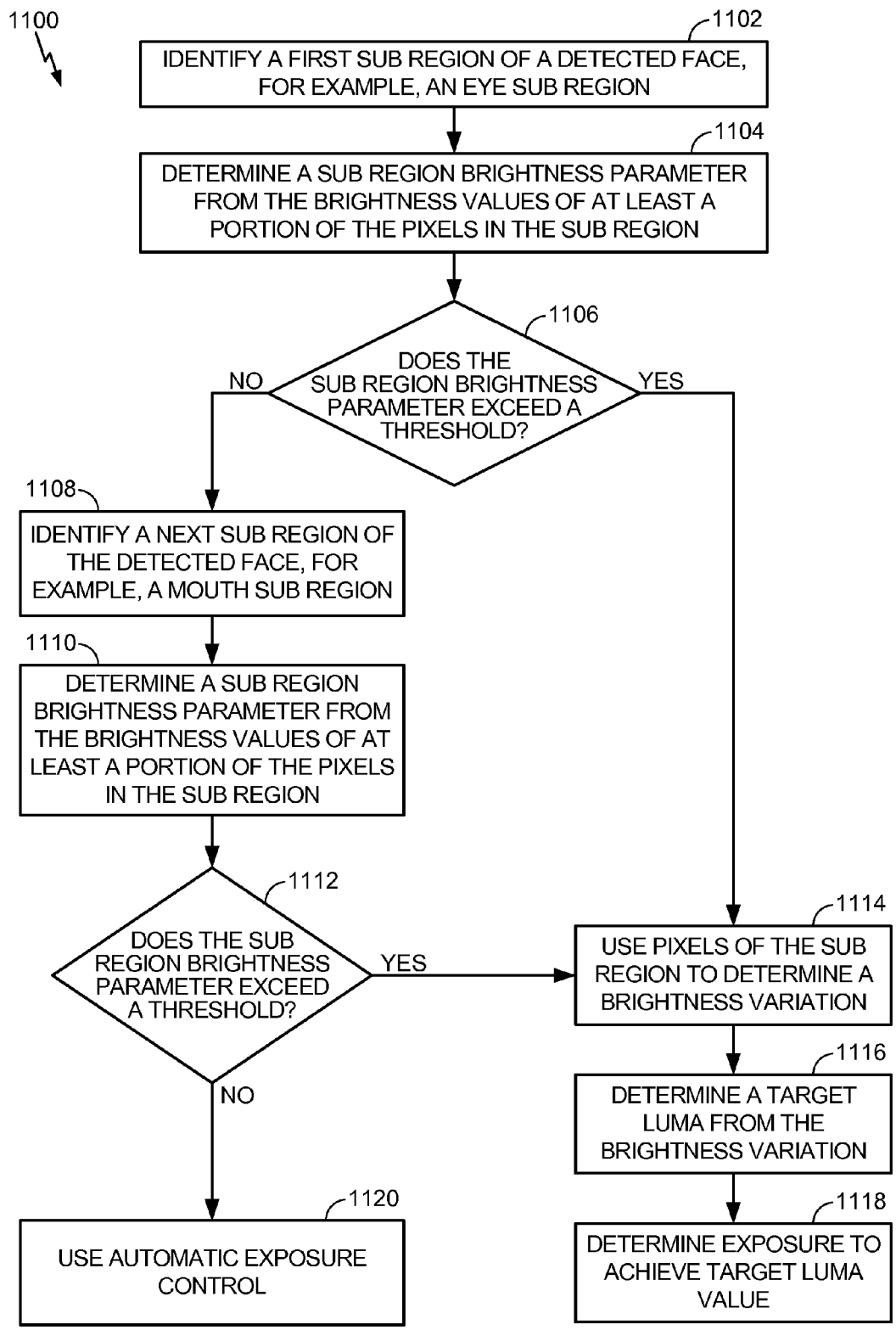
FIG. 11 is a flow chart of an embodiment of a method of testing to determine if a selected sub region of a face satisfies a brightness criteria.

FIG. 11 is a flow chart 1100 of an embodiment of a method of testing an image to determine if a selected sub region of a face satisfies a brightness criteria in order to be used to determine a face brightness variation. A first sub region of a detected face is determined, at 1102. For example, the eye sub region 304 of FIG. 3 may be determined. The sub region is evaluated to determine if it meets a first predetermined condition. In one embodiment, a sub region brightness parameter is determined from the brightness values of at least a portion of the pixels in the first sub region, at 1104. The brightness parameter of the sub region may be an average brightness of the pixels of the sub region. The brightness parameter may be evaluated to determine whether the sub region has a suitable distribution of brightness values, such as the distribution indicated by the histogram 500 of FIG. 5. For example, the brightness parameter may be compared to a predetermined threshold, at 1106, and a determination may be made whether the brightness parameter exceeds the threshold. If the brightness parameter does exceed the threshold, then the pixels of the sub region are used to determine a brightness variation, at 1114. Proceeding to 1116, a target luma is determined from the brightness variation. An exposure is determined that achieves the target luma value, at 1118.

Returning to 1106, if the sub region brightness does not exceed the threshold, a next sub region of the face is detected at 1108, for example, a mouth sub region. A sub region brightness parameter for this sub region is determined from the brightness values of at least a portion of the pixels in the sub region, at 1110. For example, the brightness parameter may be an average brightness of the pixels in the sub region. The sub region brightness parameter is compared to a threshold, at 1112. If the threshold is exceeded, then the method continues at 1114. Otherwise, automatic exposure control is implemented, at 1120.

Figure 12:
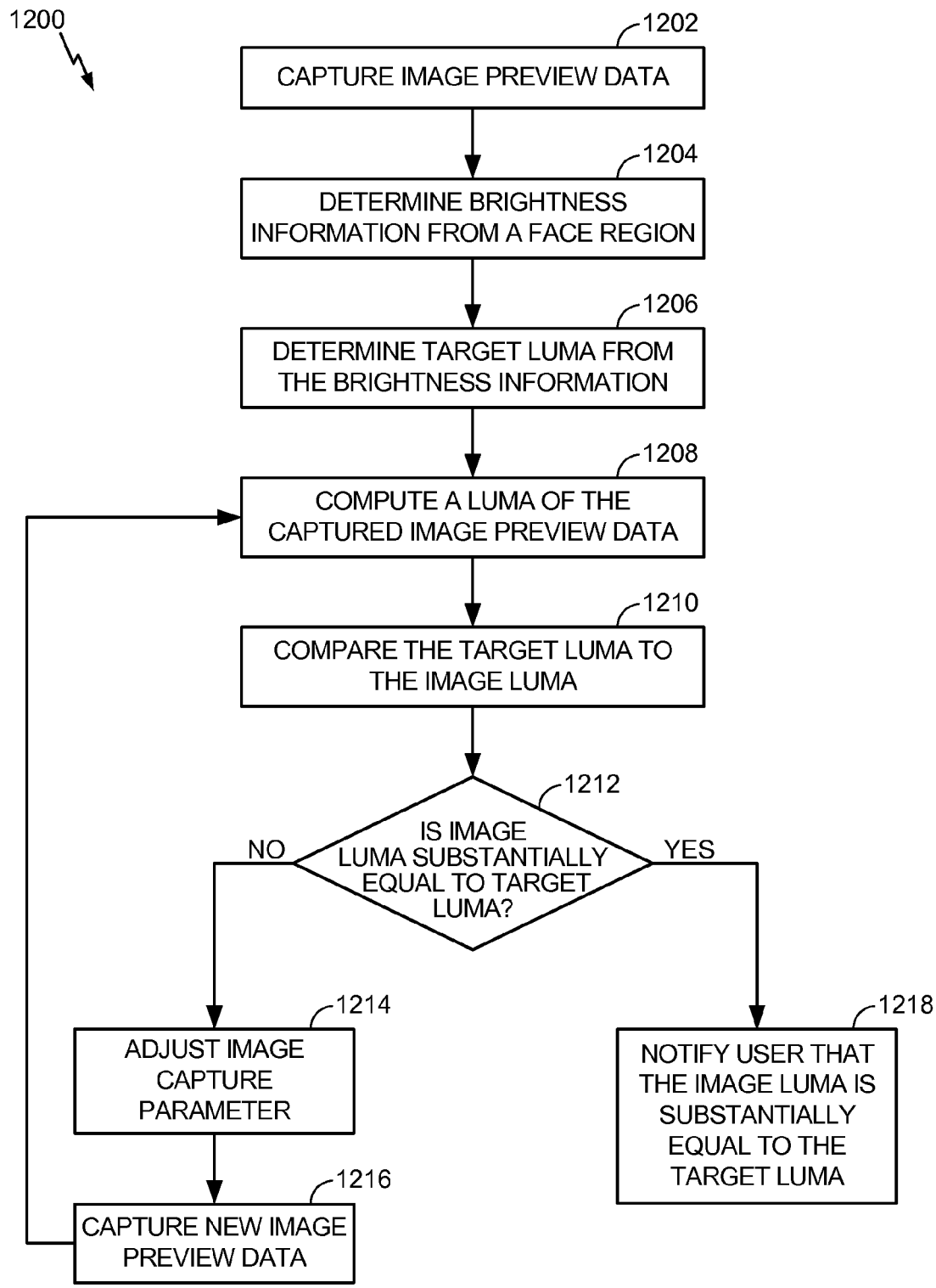
FIG. 12 is a flow chart of an embodiment of a method of iteratively adjusting an image capture processing parameter to achieve a luma value.

FIG. 12 is a flow chart 1200 of an embodiment of a method of iteratively adjusting an image capture parameter to achieve a target luma value. Image preview data is captured, at 1202. Brightness information is determined from a face region, at 1204. A target luma value is determined from the brightness information, at 1206, as described with reference to FIG. 8. A luma value of the image is computed from the brightness of the pixels in the image, at 1208. The luma value of the image may be computed by averaging the brightness of the pixels in the image. The target luma value is compared to the computed luma value, at 1210. If the computed luma value is substantially equal to the target luma value, at 1212, then the user is notified that the luma value is substantially equal to the target luma value, at 1218. The user may be notified by the display 226 of FIG. 2. If, at 1212, the computed luma value is not substantially equal to the target luma value, at 1212 then the image capture parameter is adjusted to change the luma value, at 1214. Adjusting the image capture parameter may include adjusting a shutter speed or an aperture size. New image preview data is captured at 1216, and the method continues at 1208.

Figure 13:
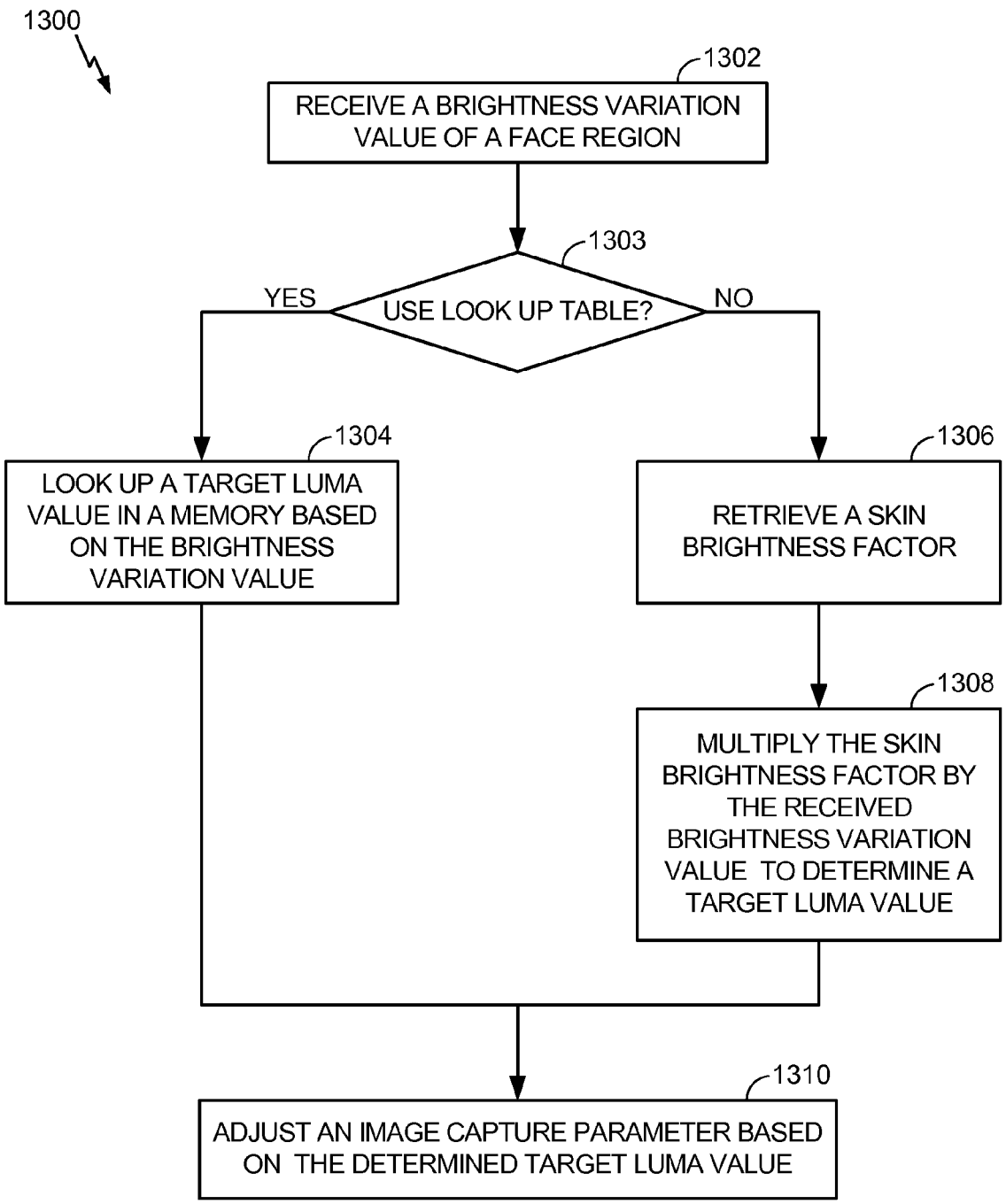
FIG. 13 is a flow chart of an embodiment of a method of determining a luma value from a face brightness factor or from a look up table.

FIG. 13 is a flow chart 1300 of an embodiment of a method of determining a luma value using a face brightness factor, or a look up table. A brightness variation value of a face region is received, at 1302. A determination is made whether to use a look up table in memory, at 1303. If a look up table is to be used, the method continues at 1304. A target luma value is retrieved from a look up table based on the brightness variation value, at 1304. If the look up table is not to be used, a skin brightness factor is retrieved from memory, at 1306. The skin brightness factor is multiplied by the received brightness variation value to determine the target luma value, at 1308. For example, the received brightness variation may be the ratio of the average brightness of pixels in a sub region to an average brightness of the brightest pixels of a sub region, as described with reference to FIG. 8. The target luma value is used to adjust an image capture parameter in order to achieve the target luma value, at 1310. For example, the target luma value may be provided to the image capture parameter adjustment module 228 of FIG. 2 to adjust the image capture parameter 230 provided to the aperture/shutter controller 206.

Figure 14:
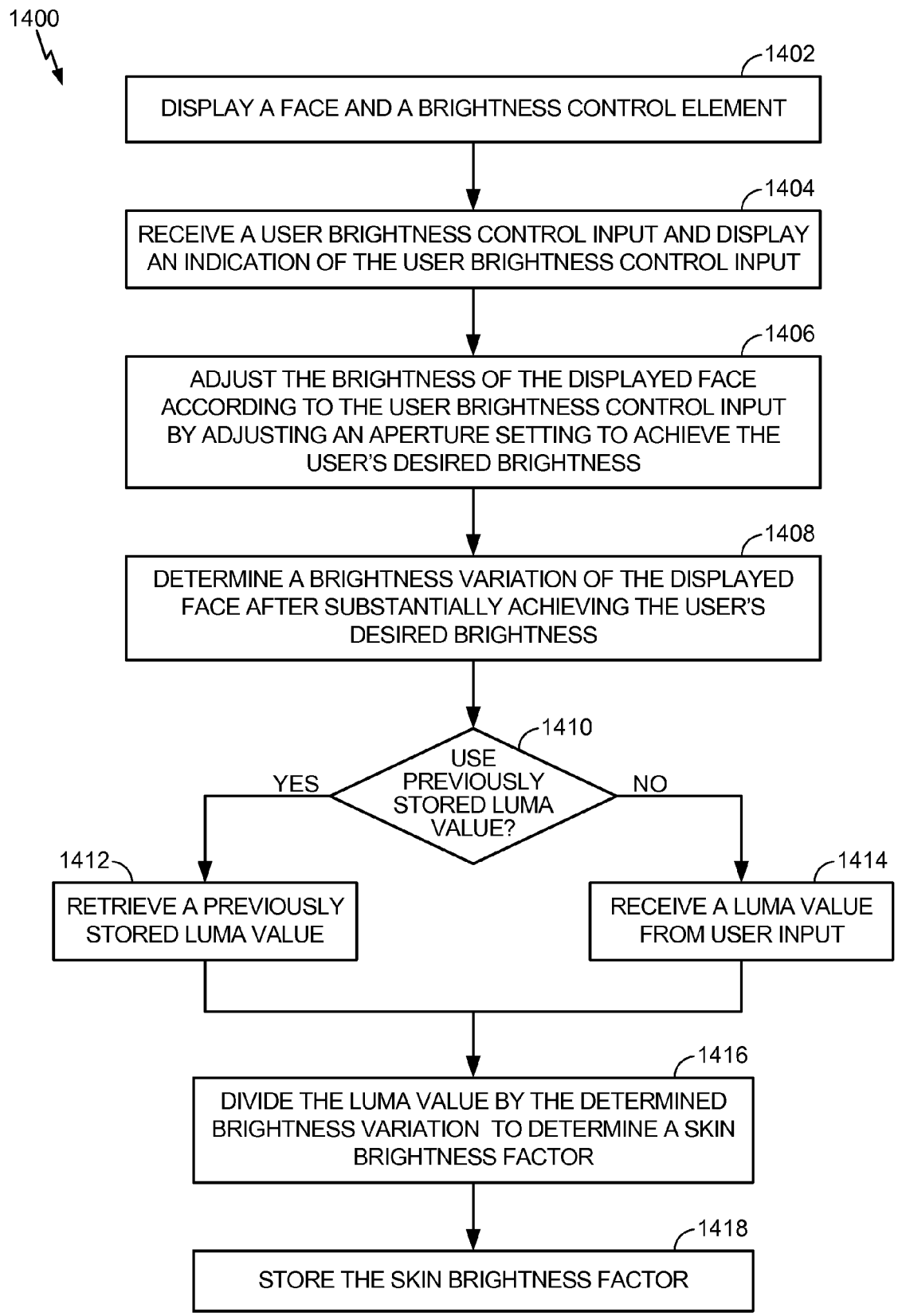
FIG. 14 is a flow chart of an embodiment of a method of determining a skin brightness factor.

FIG. 14 is a flow chart 1400 of an embodiment of a method of determining a skin brightness factor. A detected face and a brightness control element are displayed, at 1402, as will be described with reference to the graphical user interface of FIG. 17. A user-provided brightness control input is received and an indication of the brightness control input is displayed, at 1404. The brightness of a displayed face is adjusted according to a user adjustment of the brightness control element, at 1406. Adjustment of the brightness control element may cause adjustment of an aperture setting to vary the brightness of the displayed face. Once the user achieves a desired brightness, based on the brightness of the displayed face, a brightness variation for the face is determined, at 1408. In some embodiments, the user has the option, at 1410, to retrieve a previously stored luma value, at 1412, or to input a luma value, at 1414. The luma value is divided by the determined brightness variation to determine a skin brightness factor, at 1416. The skin brightness factor is stored for subsequent retrieval, at 1418. For example, the skin brightness factor can be retrieved when needed, as shown in FIG. 13.

Figure 15:
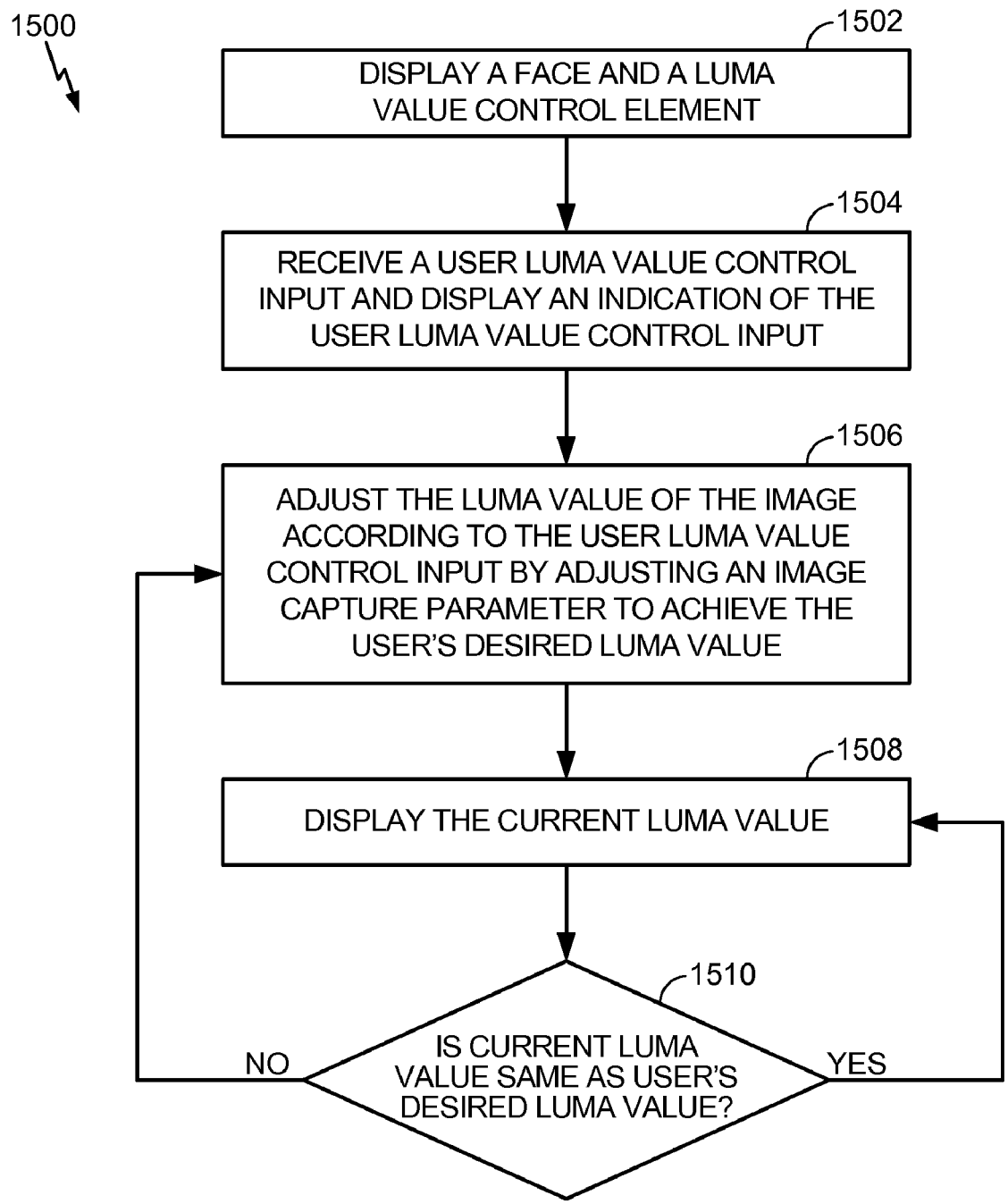
FIG. 15 is a flow chart of an embodiment of a method of receiving a luma value input from a user and adjusting an image capture processing parameter until the user-selected luma value is achieved.
Figure 18:
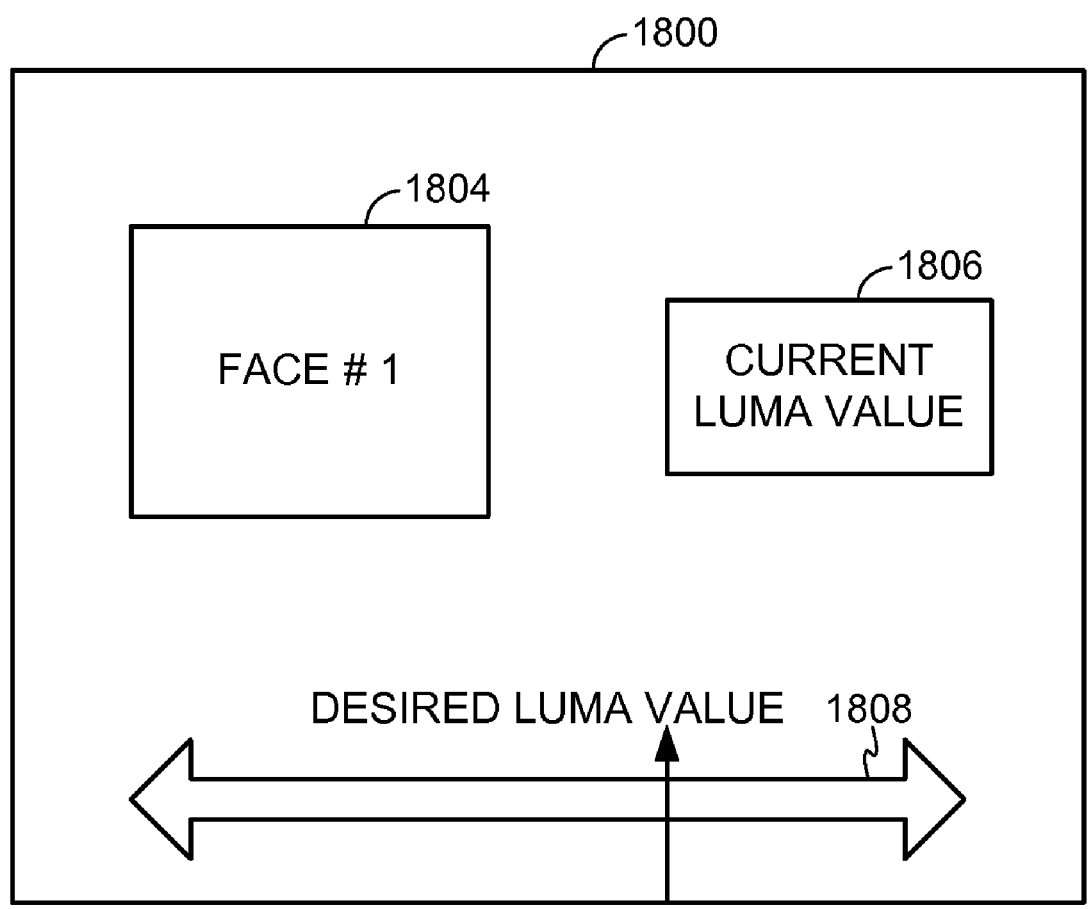
FIG. 18 is a diagram of an embodiment of a graphical user interface that enables a user to adjust a luma value of an image.

FIG. 15 is a flow chart 1500 of an embodiment of a method of receiving a luma value input from a user and adjusting an image capture processing parameter until the user-selected luma value is achieved. A face of an image and a first luma value corresponding to a brightness variation of the face, as well as a luma control element, are displayed, such as at an image preview display, at 1502. An example of display of the face, the first luma value, and the luma value control element is shown in FIG. 18. By displaying the first luma value determined from the brightness variation, the user may determine how close his own selected second luma value is to the determined first luma value. Accordingly, a user may input a second luma value using the displayed luma control element and the luma value control input is received and displayed, at 1504. The luma value of the image is adjusted to achieve, or nearly achiever, the user input second luma value by adjusting an image capture parameter, such as an aperture size or shutter speed, at 1506. The current luma value of the image is displayed, at 1508. The current luma value is compared to the user input second luma value, at 1510. If the current luma value and the selected second luma value are substantially the same, the method continues at 1508, where the current luma value is continuously displayed. If the current luma value and the second luma value input by the user are not substantially the same, the method continues at 1506, where the luma value of the image is again adjusted.

Figure 16:
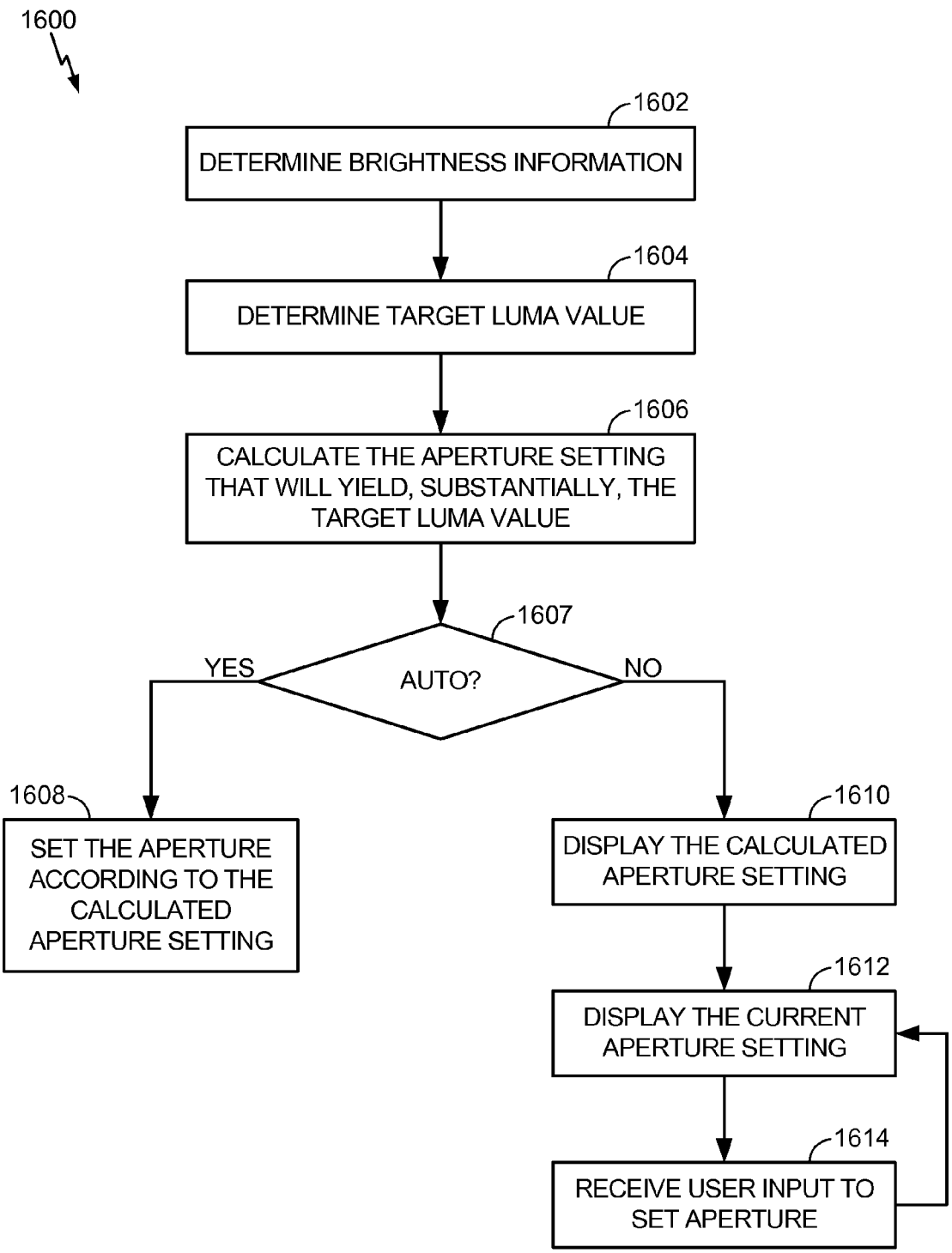
FIG. 16 is a flow chart of an embodiment of a method of setting an aperture setting automatically or according to user input.

FIG. 16 is a flow chart 1600 of an embodiment of a method of setting an aperture setting automatically or according to user input. Brightness information is determined, at 1602. The brightness information may be determined according to the flow chart of FIG. 7. A target luma value is determined from the brightness information, at 1604. An aperture setting that will substantially yield the target luma value is determined, at 1606. In some embodiments, the user has a choice, at 1607, to set the aperture manually or to automatically set the aperture according to the determined from the target luma value. If the user chooses the aperture setting determined from the target luma value, then the aperture setting determined from the luma value is used to set the aperture, at 1608. If the user chooses to manually set the aperture, the aperture setting determined from the luma value is displayed, at 1610. The current aperture setting is also displayed at 1612. If the user chooses to set the aperture manually, then the user input is received to set the aperture, at 1614. For example, the determined aperture setting and the current aperture setting may be displayed in the graphical user interface of FIG. 19. The user may set the aperture to achieve an appropriate level of brightness of the face or faces in the image.

Figure 17:
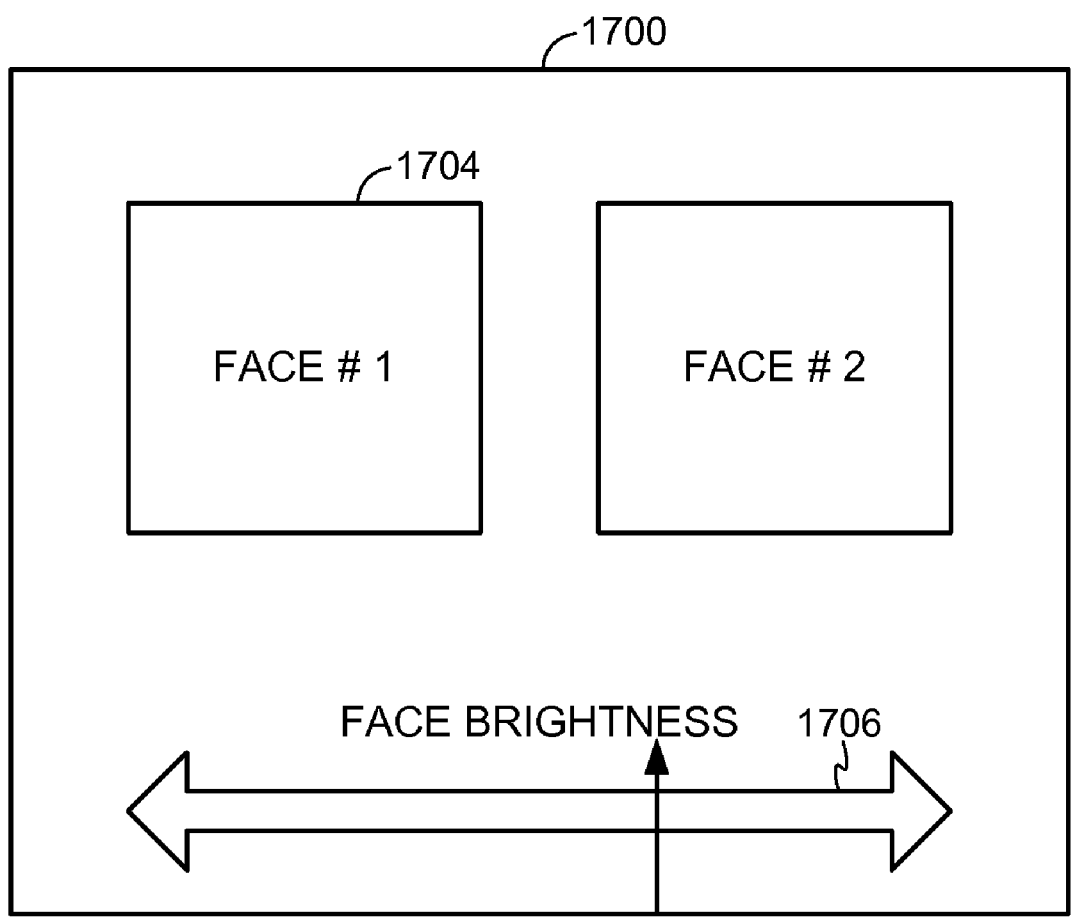
FIG. 17 is a diagram of an embodiment of a graphical user interface that enables a user to adjust face brightness.

FIG. 17 is a diagram of an embodiment of a graphical user interface 1700 that enables a user to adjust face brightness. The interface 1700 includes a face display region 1704 and a brightness control element 1706. The face display region 1704 enables the user to see how bright one or more displayed faces are while she adjusts the brightness control element 1706 to adjust the brightness. The interface 1700 may be used in conjunction with the method 1400 of FIG. 14. In a particular embodiment, the interface 1700 can be displayed by the display 226 of FIG. 2.

FIG. 18 is a diagram of an embodiment of a graphical user interface 1800 that enables a user to adjust a luma value of an image. The interface 1800 includes at least one face display region 1804 to display one or more faces detected in the image. The interface 1800 also displays a current luma value 1806 for the image and a luma value control element 1808 that is responsive to user input. Providing the current luma value 1806 and a corresponding image of a face at the face display region 1804, enables the user to see the effect of her adjustment of the luma value control element 1808. For example, the interface 1800 can be used in conjunction with the method 1500 of FIG. 15. In a particular embodiment, the interface 1800 may be displayed by display 226 of FIG. 2.

Figure 19:
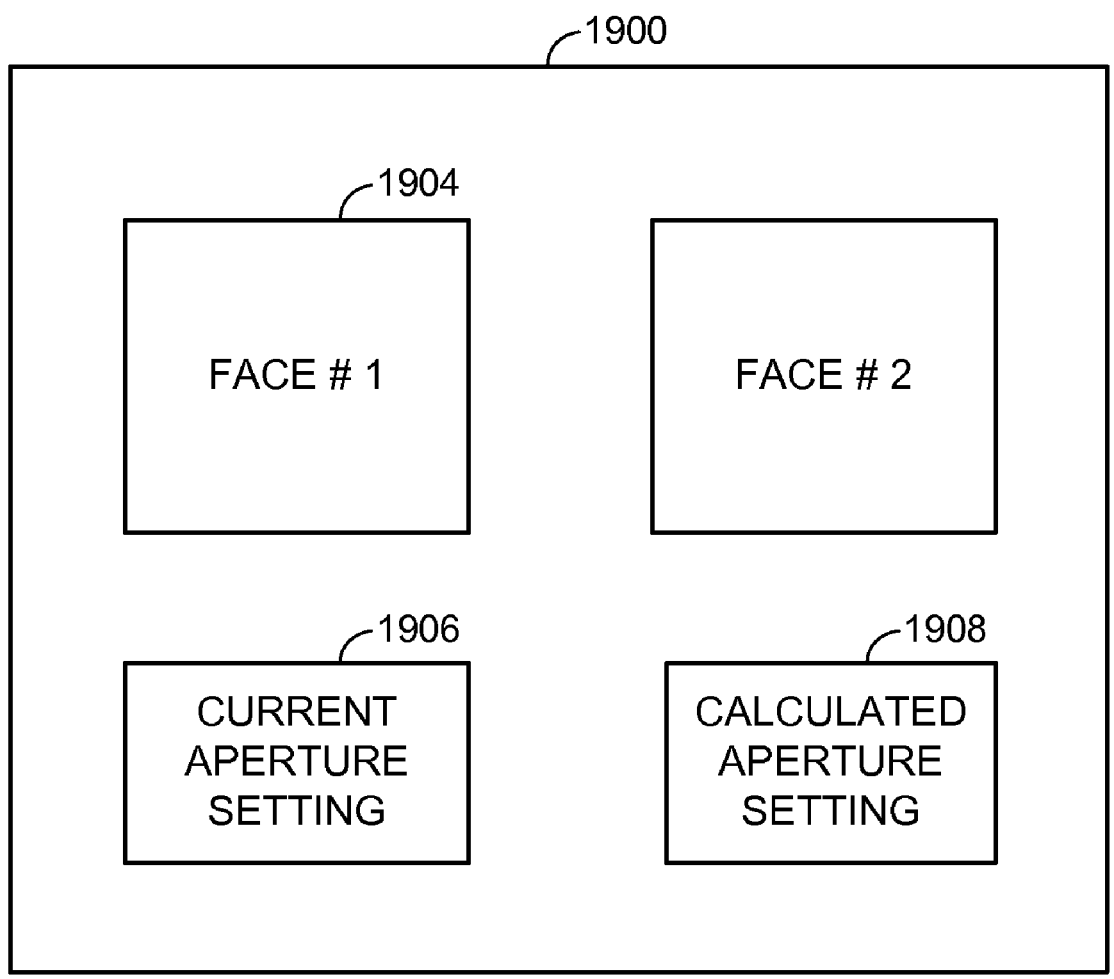
FIG. 19 is a diagram of an embodiment of a graphical user interface that displays a calculated aperture setting and a user-selected aperture setting.

FIG. 19 is a diagram of an embodiment of a graphical user interface 1900 that displays a calculated aperture setting and a user-selected aperture setting. The interface 1900 has a display region 1904 that displays at least one face detected in the image. The interface 1900 displays a current aperture setting 1906, and an aperture setting 1908 determined to achieve a target luma value. Displaying an image of a face at the face display region 1904 and the current aperture setting, enables the user to see the effect of her adjustment of the aperture setting 1908. For example, the interface 1900 can be used in conjunction with the method 1600 of FIG. 16. In a particular embodiment, the interface 1900 may be displayed by display 226 of FIG. 2

Figure 20:
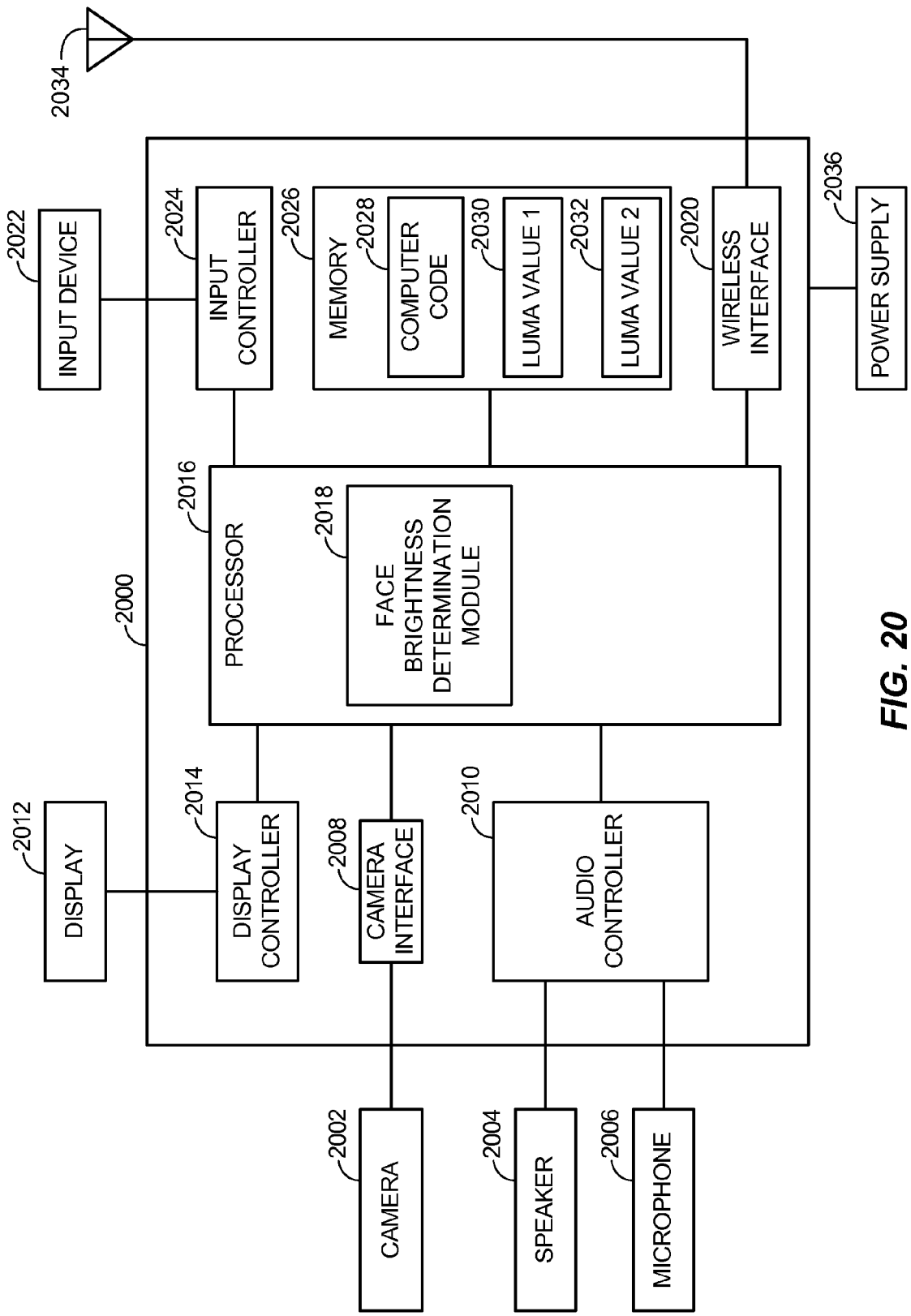
FIG. 20 is a block diagram of an embodiment of a wireless communication device having a face brightness determination module.

FIG. 20 is a block diagram of an embodiment of a wireless communication system 2000 having a face brightness determination module 2018. The system 2000 may be implemented in a portable electronic device and includes a processor 2016, such as a digital signal processor (DSP) or microcontroller, coupled to a memory 2026. The memory 2026 is a readable, tangible medium that stores computer code 2028 that, when executed by the processor 2016, causes the processor 2016 to perform operations for luma and face brightness determination. The processor 2016 includes a face brightness determination module 2018, such as the luma value and face brightness determination module 120 of FIG. 1 or module 220 of FIG. 2.

A camera interface 2008 is coupled to the processor 2016 and is also coupled to a camera 2002. The camera 2002 may be a video camera or a still image camera or may implement both functionalities. A display controller 2014 is coupled to the processor 2016 and to a display device 2012. An audio controller 2010 can also be coupled to the processor 2016. A speaker 2004 and a microphone 2006 can be coupled to the audio controller 2010. A wireless interface 2020 can be coupled to the processor 2016 and to an antenna 2034. An input device 2022 for receiving inputs to the processor 2016 may be coupled to processor 2016 via an input controller 2024. The system 2000 also includes a power supply 2036.

During operation of the system 2000 of FIG. 20, a user may initiate a capture of an image using the camera 2002. The system 2000 receives an image captured by the camera 2002. The face brightness determination module 2018 within the processor 2016 determines a luma value based on a face brightness variation of the image. In some embodiments, the face brightness determination module 2018 executes computer code 2028 stored in the memory 2026. In other embodiments, the face brightness determination module 2018 may include dedicated hardware or circuitry, or may be executable by the processor 2016 via the computer executable code 2028, or any combination thereof.

For example, in a particular embodiment, the code 2028 is executable by the processor 2016 to determine a luma value based on a brightness variation within a selected portion of an image, the selected portion corresponding to at least a portion of a face. The code 2028 also causes the processor 2016 to determine an image capture parameter based at least in part on the determined luma value. In some embodiments, the code 2028 further causes the processor 2016 to adjust an aperture setting of the camera 2002 in response to the determined image capture parameter to substantially achieve the determined luma value.

The memory 2026 also stores a plurality of luma values, such as luma value 2030 and luma value 2032, associated with face brightness variations. The display 2012 may be configured to provide an enlarged image of a detected face and may also display a luma value or an aperture setting, as described with reference to FIGS. 17-19, respectively. The input device 2022 may enable the user to adjust image brightness, to select a luma value, or to adjust an aperture setting, as described with reference to FIGS. 17-19, respectively. The images captured by the camera 2002 may be transmitted by the system 2000 wirelessly by way of the wireless interface 2020 and the antenna 2034.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. The present disclosure is not intended to be limited to the embodiments shown herein but is to be accorded the widest scope possible consistent with the principles and novel features as defined by the following claims.

The invention claimed is:

1. A method, comprising:
    determining a luma value based on a brightness variation within a selected portion of an image by comparing a first brightness of a first group of pixels within a first region of a detected face to a second brightness of a second group of pixels within a second region of the detected face, and
    adjusting an image capture parameter at least partially based on the determined luma value.

2. The method of claim 1, wherein the image capture parameter comprises an aperture size of a camera.

3. The method of claim 1, wherein the image capture parameter comprises a shutter speed of a camera.

4. The method of claim 1, wherein the second region is a subset of the first region.

5. The method of claim 1, wherein the second region is non-contiguous to the first region.

6. The method of claim 1, wherein the first brightness is an average brightness of the first group of pixels.

7. The method of claim 1, wherein the first group of pixels is selected from an eye region of the face.

8. The method of claim 7, wherein the first group of pixels is selected in response to pixels of the eye region satisfying a first predetermined condition, wherein the first predetermined condition includes an average pixel brightness of pixels of the eye region exceeding a predetermined threshold.

9. The method of claim 1, further comprising comparing the brightness variation to a threshold to classify the face as having either a dark skin color or a light skin color.

10. The method of claim 1, further comprising evaluating a brightness histogram of pixels of a region of the face to select a group of bright pixels of the region.

11. The method of claim 10, wherein the group of bright pixels includes an upper ten percent of brightest pixels in the region.

12. The method of claim 1, wherein the determined luma value is retrieved from a memory location determined by the brightness variation.

13. An apparatus, comprising:
a luma determination module to determine a luma value based on brightness information of a detected face region of an image;
a face brightness determination module to determine the brightness information based on comparing a first brightness of a first group of pixels within a first region of the detected face region to a second brightness of a second group of pixels within a second region of the detected face region; and
an image capture parameter adjustment module to determine an image capture parameter based at least in part on the determined luma value.

14. The apparatus of claim 13, wherein the image capture parameter is a shutter speed of a camera.

15. The apparatus of claim 13, further comprising an aperture adjustment device responsive to the image capture parameter to adjust an aperture setting of a camera to substantially achieve the luma value.

16. The apparatus of claim 15, wherein the image capture parameter adjustment module is configured to iteratively adjust the aperture setting until the determined luma value is substantially achieved.

17. The apparatus of claim 15, further comprising a display configured to display the aperture setting.

18. The apparatus of claim 13, further comprising a user interface to receive a brightness control input to adjust a brightness of the face region.

19. The apparatus of claim 13, further comprising an interface configured to receive a luma value input from a user of the apparatus and configured to display a calculated luma value.

20. A non-transitory computer readable storage medium storing computer executable code, comprising:
code to cause a computer to determine a luma value based on comparing a first brightness of a first group of pixels within a first region of a detected face to a second brightness of a second group of pixels within a second region of the detected face; and
code to cause the computer to determine an image capture parameter based at least in part on the determined luma value.

21. The computer readable storage medium of claim 20, wherein the computer executable code further comprises code that causes the computer to adjust an aperture setting of a camera in response to the determined image capture parameter to substantially achieve the determined luma value.

22. An apparatus, comprising:
means for determining a luma value based on comparing a first brightness of a first group of pixels within a first region of a detected face to a second brightness of a second group of pixels within a second region of the detected face; and
means for adjusting an image capture parameter at least partially based on the determined luma value.

23. The apparatus of claim 22, further comprising means for determining a brightness variation comprising means for determining a ratio of a first brightness of a first set of pixels in the selected portion of the image to a second brightness of a second set of pixels in the selected portion of the image.

24. A method, comprising:
determining a luma value based on a brightness variation within a selected portion of an image, the selected portion corresponding to at least a portion of a face;
adjusting an image capture parameter at least partially based on the determined luma value; and
evaluating a brightness histogram of pixels of a region of the face to select a group of bright pixels of the region, wherein the group of bright pixels includes an upper ten percent of brightest pixels in the region.

25. The method of claim 24, wherein the image capture parameter comprises an aperture size of a camera.

26. The method of claim 24, wherein the image capture parameter comprises a shutter speed of a camera.

* * * * *